US009001098B2

(12) United States Patent
Seo et al.

(10) Patent No.: US 9,001,098 B2
(45) Date of Patent: Apr. 7, 2015

(54) POWER SUPPLY AND DISPLAY APPARATUS HAVING THE SAME

(75) Inventors: Myung-Ho Seo, Hwaseong-si (KR); Hee-Seok Han, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 1413 days.

(21) Appl. No.: 12/712,750

(22) Filed: Feb. 25, 2010

(65) Prior Publication Data

US 2011/0115770 A1 May 19, 2011

(30) Foreign Application Priority Data

Nov. 17, 2009 (KR) ........................ 10-2009-0111010
Nov. 17, 2009 (KR) ........................ 10-2009-0111013

(51) Int. Cl.
*G06F 3/038* (2013.01)
*H05B 33/08* (2006.01)
*G09G 3/32* (2006.01)
*G09G 3/34* (2006.01)

(52) U.S. Cl.
CPC .............. *H05B 33/0815* (2013.01); *G09G 3/32* (2013.01); *G09G 3/3426* (2013.01); *G09G 2330/028* (2013.01)

(58) Field of Classification Search
CPC .............. G09G 3/3233; G09G 3/3696; G09G 2300/0819; G09G 3/3208; G09G 5/00; G09G 2300/0852; G09G 2300/0861
USPC ......... 323/282, 284, 285, 288, 222, 224, 271, 323/277; 345/211, 204; 315/169.1, 169.2
See application file for complete search history.

(56) References Cited

U.S. PATENT DOCUMENTS

| | | | | |
|---|---|---|---|---|
| 4,837,495 | A * | 6/1989 | Zansky | 323/222 |
| 6,828,766 | B2 * | 12/2004 | Corva et al. | 323/284 |
| 7,126,314 | B2 * | 10/2006 | McGinty et al. | 323/222 |
| 7,385,379 | B2 | 6/2008 | Aioanei | |
| 7,750,617 | B2 * | 7/2010 | Omi | 323/285 |
| 7,777,472 | B2 * | 8/2010 | Uehara | 323/284 |
| 8,154,267 | B2 * | 4/2012 | Noda | 323/285 |
| 8,358,118 | B2 * | 1/2013 | Chen et al. | 323/285 |
| 2003/0231012 | A1 * | 12/2003 | Corva et al. | 323/285 |
| 2007/0182392 | A1 * | 8/2007 | Nishida | 323/282 |
| 2007/0285073 | A1 * | 12/2007 | Nishida | 323/288 |
| 2008/0007233 | A1 | 1/2008 | Hane et al. | |
| 2008/0007975 | A1 | 1/2008 | Kashima | |

(Continued)

FOREIGN PATENT DOCUMENTS

| | | |
|---|---|---|
| JP | 2005-124254 A | 5/2005 |
| JP | 2006-340414 | 12/2006 |

(Continued)

OTHER PUBLICATIONS

IEEE Journal of Solid-State Circuits, vol. 40, No. 11, Nov. 2005, "A 1-V Integrated Current-Mode Boost Converter in Standard 3.3/5-V CMOS Technologies", p. 2265-2274.

(Continued)

*Primary Examiner* — Olga Merkoulova
(74) *Attorney, Agent, or Firm* — Myers Bigel Sibley & Sajovec, PA

(57) ABSTRACT

A power supply system includes a control unit comprising a detecting and converting unit that is operable to generate a detected current based on a difference between a set voltage and a voltage representative of a current flow through an energy storage member.

7 Claims, 22 Drawing Sheets

(56) References Cited

U.S. PATENT DOCUMENTS

2008/0203988 A1 * 8/2008 Horikawa et al. ............. 323/282
2009/0268492 A1 * 10/2009 Omi ................................ 363/84

FOREIGN PATENT DOCUMENTS

JP 2007-325478 12/2007
JP 2007-336742 12/2007
KR 100219095 B1 6/1999
KR 20-2000-0012380 7/2000

OTHER PUBLICATIONS

IEEE Journal of Solid State Circuits, vol. 39, No. 1, Jan. 2004, A Monolithic Current-Mode CMOS DC-DC Converter With On-Chip Current-Sensing Technique:, p. 3-14.

* cited by examiner

POWER SUPPLY AND DISPLAY APPARATUS HAVING THE SAME

CROSS-REFERENCE TO RELATED APPLICATION

This U.S. non-provisional patent application claims priority under 35 U.S.C. §119 of Korean Patent Application No. 10-2009-0111010 and No. 10-2009-0111013, filed on Nov. 17, 2009, the entire contents of which are hereby incorporated by reference.

BACKGROUND

1. Field

Example embodiments relate to a power supply. Other example embodiments relate to a power supply and a display apparatus, which has the power supply, designed to improve operational efficiency.

2. Description of Related Art

A variety of displays, such as plasma display panels (PDPs), liquid crystal displays (LCDs) and light emitting diode (LED) displays, have recently been developed and distributed. Among them, LED displays are more widely used due to their use of a stable and highly-efficient direct current (DC) power supply, generation of relatively little heat, and relatively low consumption of power. LEDs are devices that emit light when voltage is applied (to opposite terminals). To allow the light emitted from such an LED to maintain constant brightness, a constant voltage is stably applied to the opposite terminals of the LED. Thus, LED displays may be equipped with a switching mode power supply (SMPS), which supplies constant voltage.

A SMPS is a power supply that receives input voltage, raises or lowers the input voltage according to the switching time of an internal switching element, and generates an output voltage having a desired level. The SMPS is capable of being manufactured in a relatively small-size and light-weight, and thus is widely used. Here, an operating time of the switching element is controlled by the duty ratio of a switching signal input into the switching element. The SMPS continuously monitors a change in level of the output voltage to vary the duty ratio of the switching signal depending on the level change of the output voltage, thereby controlling the output voltage at a relatively constant level.

SUMMARY

Example embodiments provide a power supply that controls supply voltage, which linearly operates an internal element such as an amplifier, to be stably maintained constant.

Example embodiments provide a power supply that prevents a peak noise caused due to a tailing of a slop current, thereby preventing a malfunction.

Example embodiments also provide a power supply that consumes voltage and current only during an effective operation period, and interrupts the voltage and current during an ineffective operation period, thereby making it possible to reduce unnecessary power consumption.

According to some embodiments, a power supply system comprises a control unit comprising a detecting and converting unit that is operable to generate a detected current based on a difference between a set voltage and a voltage representative of a current flow through an energy storage member.

In other embodiments, the power supply system further comprises a supply voltage generating unit that is operable to generate an output voltage in response to an input voltage, the supply voltage generating unit comprising the energy storage member coupled between the input voltage and a switch such that the energy storage member stores energy when the switch is in a first state and releases energy in a second state to generate the output voltage.

In still other embodiments, the control unit further comprises a reference current generating unit that is operable to generate a reference current based on a difference between the output voltage and a reference voltage. The control unit is operable to control the duty cycle of the switch between the first and second states based on the detected current and the reference current.

In still other embodiments, the control unit further comprises a slope current generating unit that is operable to generate a compensation current and an adder that is operable to combine the compensation current and the detected current. The control unit is operable to control the duty cycle of the switch between the first and second states based on the combination of the compensation current and the detected current and the reference current.

In still other embodiments, the power supply system further comprises a voltage generating unit that is operable to generate the set voltage responsive to a power supply voltage.

In still other embodiments, the detecting and converting unit comprises a voltage control unit that is operable to generate a reverse voltage responsive to the set voltage and the voltage representative of the current flow through the energy storage member, a magnitude of the reverse voltage being inversely correlated with a magnitude of the voltage representative of the current flow through the energy storage member and a voltage-current converting unit that is operable to generate the detected current responsive to the reverse voltage, a magnitude of the detected current being inversely correlated with a magnitude of the reverse voltage.

In further embodiments of the present invention, a power supply system comprises a supply voltage generating unit that is operable to generate an output voltage in response to an input voltage, the supply voltage generating unit comprising an energy storage member coupled between an input voltage and a switch such that the energy storage member stores energy when the switch is in a first state and releases energy in a second state to generate the output voltage, the switch being responsive to a switch control signal and a control unit. The control unit comprises a detecting and converting unit that is operable to generate a detected current based on a difference between a set voltage and a voltage representative of a current flow through the energy storage member and a switching control unit that is operable to generate the switch control signal to control the duty cycle of the switch between the first and second states based on the detected current and a difference between the output voltage and a reference voltage. The detecting and converting unit is responsive to the switch control signal such that the detecting and converting unit is disabled when the switch is placed in the second state.

In still further embodiments, the control unit further comprises a reference current generating unit that is operable to generate a reference current (Iref) based on a difference between the output voltage and the reference voltage. The switching control unit is operable to control the duty cycle of the switch between the first and second states based on the detected current and the reference current.

In still further embodiments, the control unit further comprises a slope current generating unit that is operable to generate a compensation current and an adder that is operable to combine the compensation current and the detected current. The switching control unit is operable to control the duty cycle of the switch between the first and second states based on the combination of the compensation current and the detected current and the reference current. The slope current generating unit is responsive to the switch control signal such that the slope current generating unit is disabled when the switch is placed in the second state.

In still further embodiments, the switching control unit comprises a comparator that is operable to generate a comparison signal responsive to the detected current and the reference current, a pulse width modulator circuit that is operable to generate a modulated clock signal responsive to an input clock signal, and a flip-flop circuit that is configured to generate the switch control signal responsive to the modulated clock signal and the comparison signal.

In still further embodiments, the power supply system further comprises a voltage generating unit that is operable to generate the set voltage responsive to a power supply voltage.

In still further embodiments, the detecting and converting unit comprises a voltage control unit that is operable to generate a reverse voltage responsive to the set voltage and the voltage representative of the current flow through the energy storage member, a magnitude of the reverse voltage being inversely correlated with a magnitude of the voltage representative of the current flow through the energy storage member and a voltage-current converting unit that is operable to generate the detected current responsive to the reverse voltage, a magnitude of the detected current being inversely correlated with a magnitude of the reverse voltage.

In still further embodiments, the voltage control unit further comprises a first power interface circuit that is responsive to the switch control signal so as to electrically disconnect the voltage control unit from a power supply when the switch is placed in the second state. The voltage-current converting unit further comprises a second power interface circuit that is responsive to the switch control signal so as to electrically disconnect the voltage-current converting unit from the power supply when the switch is placed in the second state.

In other embodiments of the present invention, a power supply system comprises a control unit, which comprises a detecting and converting unit that is operable to generate a detected current based on a difference between a set voltage and a voltage representative of a current flow through an energy storage member, a slope current generating unit that is operable to generate a compensation current, and an adder that is operable to combine the compensation current and the detected current. The power supply system further comprises a clock generator that is operable to generate a clock signal. The slope current generating unit is responsive to the clock signal such that the slope current generating unit is disabled during a portion of the clock signal period.

In still other embodiments, the power supply system further comprises a supply voltage generating unit that is operable to generate an output voltage in response to an input voltage, the supply voltage generating unit comprising the energy storage member coupled between the input voltage and a switch such that the energy storage member stores energy when the switch is in a first state and releases energy in a second state to generate the output voltage.

In still other embodiments, the control unit further comprises a reference current generating unit that is operable to generate a reference current based on a difference between the output voltage and a reference voltage. The control unit is operable to control the duty cycle of the switch between the first and second states based on the detected current and the reference current.

In still other embodiments, the control unit is operable to control the duty cycle of the switch between the first and second states based on the combination of the compensation current and the detected current and the reference current.

In still other embodiments, a portion of the clock signal period in which the slope current generating unit is not disabled exceeds a time that the switch is in the first state.

In still other embodiments, the power supply system further comprises a voltage generating unit that is operable to generate the set voltage responsive to a power supply voltage.

In still other embodiments, the detecting and converting unit comprises a voltage control unit that is operable to generate a reverse voltage responsive to the set voltage and the voltage representative of the current flow through the energy storage member, a magnitude of the reverse voltage being inversely correlated with a magnitude of the voltage representative of the current flow through the energy storage member and a voltage-current converting unit that is operable to generate the detected current responsive to the reverse voltage, a magnitude of the detected current being inversely correlated with a magnitude of the reverse voltage.

In further embodiments of the present invention, a power supply system comprises a supply voltage generating unit that is operable to generate an output voltage in response to an input voltage, the supply voltage generating unit comprising an energy storage member coupled between an input voltage and a switch such that the energy storage member stores energy when the switch is in a first state and releases energy in a second state to generate the output voltage, the switch being responsive to a switch control signal and a control unit. The control unit comprises a detecting and converting unit that is operable to generate a detected current based on a difference between a set voltage and a voltage representative of a current flow through the energy storage member and a switching control unit that is operable to generate the switch control signal to control the duty cycle of the switch between the first and second states based on the detected current and a difference between the output voltage and a reference voltage, and a switching signal modulating unit that is operable to generate a modulated switch control signal responsive to the switch control signal and a clock signal. The detecting and converting unit is responsive to the modulated switch control signal such that the detecting and converting unit is enabled when the switch is placed in the first state, is enabled during a portion of a time that the switch is placed in the second state adjacent temporally to a time that the detecting and converting unit is enabled when the switch is placed in the first state, and is disabled during a remainder of time that the switch is placed in the second state.

In still further embodiments, the control unit further comprises a reference current generating unit that is operable to generate a reference current based on a difference between the output voltage and the reference voltage. The switching control unit is operable to control the duty cycle of the switch between the first and second states based on the detected current and the reference current.

In still further embodiments, the control unit further comprises a slope current generating unit that is operable to generate a compensation current and an adder that is operable to combine the compensation current and the detected current. The switching control unit is operable to control the duty cycle of the switch between the first and second states based on the combination of the compensation current and the detected current and the reference current. The slope current generating unit is responsive to the modulated switch control signal such that slope current generating unit is enabled when the switch is placed in the first state, is enabled during a portion of a time that the switch is placed in the second state adjacent temporally to a time that the detecting and converting unit is enabled when the switch is placed in the first state, and is disabled during a remainder of time that the switch is placed in the second state.

In still further embodiments, the switching control unit comprises a comparator that is operable to generate a comparison signal responsive to the detected current and the reference current, a pulse width modulator circuit that is operable to generate a modulated clock signal responsive to an input clock signal, and a flip-flop circuit that is configured to generate the switch control signal responsive to the modulated clock signal and the comparison signal.

In still further embodiments, the power supply system further comprises a voltage generating unit that is operable to generate the set voltage responsive to a power supply voltage.

In still further embodiments, the detecting and converting unit comprises a voltage control unit that is operable to generate a reverse voltage responsive to the set voltage and the voltage representative of the current flow through the energy storage member, a magnitude of the reverse voltage being inversely correlated with a magnitude of the voltage representative of the current flow through the energy storage member and a voltage-current converting unit that is operable to generate the detected current responsive to the reverse voltage, a magnitude of the detected current being inversely correlated with a magnitude of the reverse voltage.

In still further embodiments, the switching signal modulating unit comprises an inversion and delay unit that is operable to generate a delayed and inverted clock signal responsive to the clock signal and a logical OR circuit that generates the modulated switch control signal responsive to the switch control signal and the delayed and inverted clock signal.

In still further embodiments, the voltage control unit further comprises a first power interface circuit that is responsive to the modulated switch control signal so as to electrically disconnect the voltage control unit from a power supply during the remainder of time that the switch is placed in the second state. The voltage-current converting unit further comprises a second power interface circuit that is responsive to the switch control signal so as to electrically disconnect the voltage-current converting unit from the power supply during the remainder of time that the switch is placed in the second state.

In other embodiments of the present invention, a display apparatus comprises a power supply comprising an energy storage member that is operable to generate an output voltage and a control unit, comprising a detecting and converting unit that is operable to generate a detected current based on a difference between a set voltage and a voltage representative of a current flow through the energy storage member. The display apparatus further comprises a lighting unit that is responsive to the output voltage.

In further embodiments of the present invention, a display apparatus comprises a supply voltage generating unit that is operable to generate an output voltage in response to an input voltage, the supply voltage generating unit comprising an energy storage member coupled between an input voltage and a switch such that the energy storage member stores energy when the switch is in a first state and releases energy in a second state to generate the output voltage, the switch being responsive to a switch control signal and a control unit, comprising a detecting and converting unit that is operable to generate a detected current based on a difference between a set voltage and a voltage representative of a current flow through the energy storage member and a switching control unit that is operable to generate the switch control signal to control the duty cycle of the switch between the first and second states based on the detected current and a difference between the output voltage and a reference voltage. The display apparatus further comprises a lighting unit that is responsive to the output voltage. The detecting and converting unit is responsive to the switch control signal such that the detecting and converting unit is disabled when the switch is placed in the second state.

In other embodiments of the present invention, a display apparatus comprises an energy storage member that is operable to generate an output voltage and a control unit, comprising a detecting and converting unit that is operable to generate a detected current based on a difference between a set voltage and a voltage representative of a current flow through the energy storage member, a slope current generating unit that is operable to generate a compensation current, and an adder that is operable to combine the compensation current and the detected current. The display apparatus further comprises a clock generator that is operable to generate a clock signal and a lighting unit that is responsive to the output voltage. The slope current generating unit is responsive to the clock signal such that the slope current generating unit is disabled during a portion of the clock signal period.

In further embodiments of the present invention, a display apparatus comprises a supply voltage generating unit that is operable to generate an output voltage in response to an input voltage, the supply voltage generating unit comprising an energy storage member coupled between an input voltage and a switch such that the energy storage member stores energy when the switch is in a first state and releases energy in a second state to generate the output voltage, the switch being responsive to a switch control signal and a control unit, comprising a detecting and converting unit that is operable to generate a detected current based on a difference between a set voltage and a voltage representative of a current flow through the energy storage member, a switching control unit that is operable to generate the switch control signal to control the duty cycle of the switch between the first and second states based on the detected current and a difference between the output voltage and a reference voltage, and a switching signal modulating unit that is operable to generate a modulated switch control signal responsive to the switch control signal and a clock signal. The display apparatus further comprises a lighting unit that is responsive to the output voltage. The detecting and converting unit is responsive to the modulated switch control signal such that the detecting and converting unit is enabled when the switch is placed in the first state, is enabled during a portion of a time that the switch is placed in the second state adjacent temporally to a time that the detecting and converting unit is enabled when the switch is placed in the first state, and is disabled during a remainder of time that the switch is placed in the second state.

According to example embodiments, the power supply allows internal elements to be linearly operated regardless of the level of a voltage detected to maintain supply voltage constant, thereby making it possible to stably maintain the supply voltage constant.

Further, the power supply prevents the peak noise caused due to the tailing of the slope current by generating the slope current only during a predetermined period detecting, thereby compensating for the detection current, thereby preventing the malfuction.

Further, the power supply supplies voltage and current only during an effective operation period, and interrupts the voltage and current during an ineffective operation period, thereby making it possible to reduce unnecessary power consumption.

BRIEF DESCRIPTION OF THE DRAWINGS

Example embodiments are described in further detail below with reference to the accompanying drawings. It should be understood that various aspects of the drawings may have been exaggerated for clarity.

DETAILED DESCRIPTION OF THE EMBODIMENTS

Figure 1:
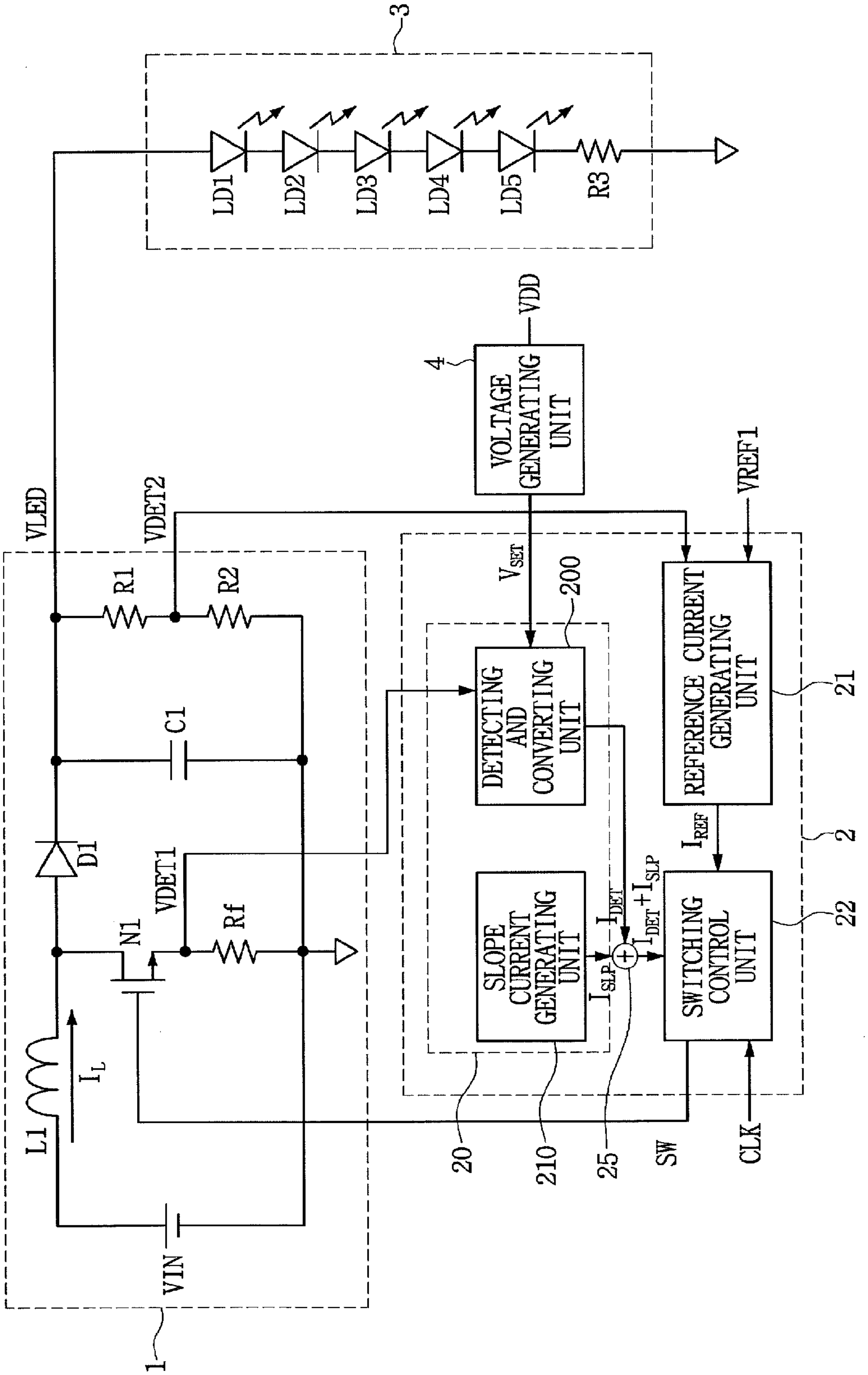
FIG. 1 illustrates a display apparatus according to a first example embodiment of the inventive concept.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A power supply and a display apparatus having the same according to example embodiments of the inventive concept will be described below with reference to the accompanying drawings.

FIG. 1 illustrates a display apparatus according to a first example embodiment of the inventive concept.

As illustrated in FIG. 1, the display apparatus according to a first example embodiment of the inventive concept includes an LED supply voltage generating unit 1, a control unit 2, a lighting unit 3, and a voltage generating unit 4. Here, the control unit 2 includes a voltage detecting and current generating unit 20, a reference current generating unit 21, and a switching control unit 22. The voltage detecting and current generating unit 20 includes a detecting and converting unit 200 and a slope current generating unit 210.

In the display apparatus having this configuration, exemplary operations of each block will be described below.

The LED supply voltage generating unit 1 of FIG. 1 is one example of a boost converter of direct current to direct current (DC-to-DC) converters, and varies the electromotive force of a coil L1 depending on the duty ratio of a switching signal SW, thereby raising input voltage VIN to generate LED supply voltage VLED having a higher level than the input voltage VIN. Generally, the DC-to-DC converters include a buck converter that lowers input voltage to generate an output voltage having a relatively lower level, a boost converter that raises input voltage to generate an output voltage having a relatively higher level, a buck-boost converter that has both a voltage lowering characteristic and a voltage raising characteristic, and so on. Here, the duty ratio of the switching signal SW is defined as a ratio of an active period to one period of the switching signal SW.

Meanwhile, the operation of the LED supply voltage generating unit 1 will be described below in connection with each of active and inactive periods of the switching signal SW.

First, during an active period, i.e. a high-level period, of the switching signal SW, the n-type metal oxide semiconductor (NMOS) transistor N1 is turned on, and current flows through a coil L1, the NMOS transistor N1, and a resistor Rf. At this time, the coil L1 converts electric energy into magnetic energy, and stores the magnetic energy, which corresponds to the current. Thus, as the active period of the switching signal SW lengthens, the magnetic energy stored in the coil L1 gradually increases.

Next, during an inactive period, i.e. a low-level period, of the switching signal SW, the NMOS transistor N1 is turned off, and the magnetic energy, which is stored in the coil L1 during the active period of the switching signal SW, is converted into electric energy. In detail, the coil L1 generates current by an electromotive force corresponding to a magnitude of the stored magnetic energy. This current flows through a diode D1 and resistors R1 and R2. Here, the magnetic energy, which is stored in the coil L1, decreases at the same speed at which it increases. Meanwhile, an LED supply voltage VLED is generated across the resistors R1 and R2 by the electromotive force and the input voltage VIN, and simultaneously charges a capacitor C1 connected to the resistors R1 and R2 in parallel. As the magnetic energy, which is stored in the coil L1 during the active period of the switching signal SW, rises, the electromotive force of the coil L1 also rises. Thus, the LED supply voltage VLED is further raised.

Then, when the switching signal SW is activated again, the current flows through the NMOS transistor N1 and the resistor Rf. The coil L1 stores the magnetic energy again. At this time, a voltage level of the LED supply voltage VLED is maintained by the voltage stored in the capacitor C1.

As described above, when the duty ratio of the switching signal SW increases, the LED supply voltage generating unit 1 increases the electromotive force of the coil L1 to raise the LED supply voltage VLED. Likewise, when the duty ratio of the switching signal SW decreases, the LED supply voltage generating unit 1 reduces the electromotive force of the coil L1 to lower the LED supply voltage VLED.

Meanwhile, the LED supply voltage generating unit 1 generates a first detection voltage VDET1 varying depending on coil current $I_L$, and a second detection voltage VDET2 varying depending on the LED supply voltage VLED. The first detection voltage VDET1 is a voltage that is applied across the resistor Rf, and is increased depending on the coil current $I_L$ flowing through the NMOS transistor N1 during the active period of the switching signal SW. When the switching signal SW is inactivated, the NMOS transistor N1 is turned off, so that the first detection voltage VDET1 is lowered to 0V. Here, because the electromotive force of the coil L1 is increased depending on the coil current $I_L$, a change in the electromotive force of the coil L1 may be recognized from the first detection voltage VDET1 varying depending on the coil current $I_L$. Further, the second detection voltage VDET2 is a fraction of the LED supply voltage VLED partitioned between the resistors R1 and R2, and is set so as to be lower than the LED supply voltage VLED.

Next, the control unit 2 adjusts the duty ratio of the switching signal SW to control the electromotive force of the coil L1 such that the LED supply voltage VLED generated from the LED supply voltage generating unit 1 can reach a target voltage and continue to be maintained at a level of the target voltage. The control unit 2 detects the change of the LED supply voltage VLED and the change of the electromotive force of the coil L1 through the first and second detection voltages VDET1 and VDET2, and adjusts the level of the LED supply voltage VLED using the switching signal SW. In detail, when the LED supply voltage VLED is lower than the target voltage, the control unit 2 increases the duty ratio of the switching signal SW to increase the electromotive force of the coil L1 to raise the LED supply voltage VLED. In contrast, when the LED supply voltage VLED is higher than the target voltage, the control unit 2 decreases the duty ratio of the switching signal SW to decrease the electromotive force of the coil L1 to lower the LED supply voltage VLED.

In the control unit 2, exemplary operations of each block will be described below in detail.

First, the voltage detecting and current generating unit 20, which comprises the detecting and converting unit 200 and the slope current generating unit 210, receives the first detection voltage VDET1 from the LED supply voltage generating unit 1, converts the received voltage into detection current $I_{DET}$, outputs the detection current $I_{DET}$. And, the voltage detecting and current generating unit 20 outputs a slope compensation current $I_{SLP}$ to compensate for the detection current $I_{DET}$, a waveform of which is distorted by sub-harmonic oscillation as the duty ratio of the switching signal SW increases. The slope compensation current $I_{SLP}$ is added to the detection current $I_{DET}$ by the summation unit 25, and the sum of the currents is input to the switching control unit 22 as a compensated detection current $I_{DET}+I_{SLP}$.

The sub-harmonic oscillation refers to a phenomenon in which a ripple occurs in the current flowing through the coil L1 when the duty ratio of the switching signal SW is more than 50% in connection with current control. This ripple is a phenomenon caused by the instability of a switching mode power supply (SMPS). The slope current generating unit 210 is provided to remove the ripple.

As for each block of the voltage detecting and current generating unit 20, the detecting and converting unit 200 receives the first detection voltage VDET1, which varies depending on the coil current $I_L$, from the LED supply voltage generating unit 1, converts the received voltage into the detection current $I_{DET}$, and outputs the converted detection current $I_{DET}$. Thus, the detection current $I_{DET}$ also varies depending on the coil current $I_L$. The slope current generating unit 210 generates the slope compensation current $I_{SLP}$ during the active period of the switching signal SW, and outputs the slope compensation current $I_{SLP}$.

Meanwhile, because this compensated detection current $I_{DET}+I_{SLP}$ varies depending on the coil current $I_L$, it is possible to detect the change of the electromotive force of the coil L1 through the compensated detection current $I_{DET}+I_{SLP}$. In detail, an increase in the compensated detection current $I_{DET}+I_{SLP}$ during the active period of the switching signal SW means that the electromotive force of the coil L1 increases. In contrast, a decrease in the compensated detection current $I_{DET}+I_{SLP}$ during the active period of the switching signal SW means that the electromotive force of the coil L1 decreases.

Next, the reference current generating unit 21 compares the LED supply voltage VLED with the target voltage using the second detection voltage VDET2 and first reference voltage VREF1, and generates reference current $I_{REF}$ for adjusting the duty ratio of the switching signal SW output from the switching control unit 22. Here, the target voltage is a voltage which the LED supply voltage VLED reaches in order to emit light from the LED, and the first reference voltage VREF1 is a voltage that lowers the target voltage.

More specifically, the reference current generating unit 21 increases the reference current $I_{REF}$ as a voltage difference between the first reference voltage VREF1 and the second detection voltage VDET2 increases, and decreases the reference current $I_{REF}$ as the voltage difference decreases. Meanwhile, when the second detection voltage VDET2 reaches the first reference voltage VREF1, the reference current generating unit 21 maintains the reference current $I_{REF}$ constant. Here, because the first reference voltage VREF1 is fixed at a predetermined level according to the target voltage, a voltage difference between the first reference voltage VREF1 and the second detection voltage VDET2 is substantially varied depending on the change of the second detection voltage VDET2. Thus, in comparison with the first reference voltage VREF1, the first reference voltage VREF1 increases as the second detection voltage VDET2 decreases.

In summary, because the second detection voltage VDET2 varies depending on the LED supply voltage VLED, the reference current generating unit 21 generates the reference current $I_{REF}$ varied depending on the LED supply voltage VLED. Here, the reference current generating unit 21 may be implemented as an operational transconductance amplifier (OTA), which converts a difference between two voltages into a current.

Meanwhile, the switching control unit 22 receives both the compensated detection current $I_{DET}+I_{SLP}$ from the voltage detecting and current generating unit 20 and the reference current $I_{REF}$ from the reference current generating unit 21, and generates the switch signal SW, whose duty ratio is adjusted according to the result of comparison between the compensated detection current $I_{DET}+I_{SLP}$ and the reference current $I_{REF}$, and whose period is identical to that of a clock signal CLK.

The switching control unit 22 activates the switching signal SW in response to the clock signal CLK, maintains the activated state until the compensated detection current $I_{DET}+I_{SLP}$ becomes equal to the reference current $I_{REF}$, and inactivates the switching signal SW when the compensated detection current $I_{DET}+I_{SLP}$ becomes equal to the reference current $I_{REF}$. In detail, when the compensated detection current $I_{DET}+I_{SLP}$ is less than the reference current $I_{REF}$, the switching control unit 22 determines that the electromotive force of the coil L1 is still insufficient to raise the LED supply voltage VLED to the target voltage, and thus continues to maintain the active period of the switching signal SW. In contrast, when the compensated detection current $I_{DET}+I_{SLP}$ becomes equal to the reference current $I_{REF}$, the switching control unit 22 determines that the electromotive force of the coil L1 is sufficient to raise the LED supply voltage VLED to the target voltage, and thus inactivates the switching signal SW.

In this manner, the switching control unit 22 generates the switch signal SW, whose period is identical to that of the clock signal CLK, and whose active period is maintained until the electromotive force of the coil L1 has a magnitude capable of increasing the LED supply voltage VLED to reach the target voltage.

Meanwhile, a plurality of LEDs LD1 to LD5 comprising the lighting unit 3 receive the LED supply voltage VLED to emit light.

The voltage generating unit 4 receives the supply voltage VDD to generate a set voltage $V_{SET}$, and applies the set voltage $V_{SET}$ to the detecting and converting unit 200 of the voltage detecting and current generating unit 20. As described below, the set voltage $V_{SET}$ is a voltage that is set to a predetermined voltage level in order to ensure stable operation of the detecting and converting unit 200. Here, the voltage generating unit 4 may be implemented by a new circuit. Alternatively, the voltage generating unit 4 may be implemented by modification of an ordinary circuit such as a band-gap reference voltage generating circuit.

As described above, the display apparatus of the inventive concept performs the operation of adjusting the electromotive force of the coil L1 during the active period of the switching signal SW to adjust the LED supply voltage VLED to the target voltage depending on the voltage difference between the LED supply voltage VLED generated across the resistors R1 and R2 and the target voltage. After the electromotive force of the coil L1 is adjusted by this operation, the switching signal SW is inactivated. Then, the level of the LED supply voltage VLED is raised and lowered by the adjusted electromotive force of the coil L1, so that the LED supply voltage VLED is maintained constant. As a result, the LEDs LD1 to LD5 are maintained at constant brightness.

Figure 2:
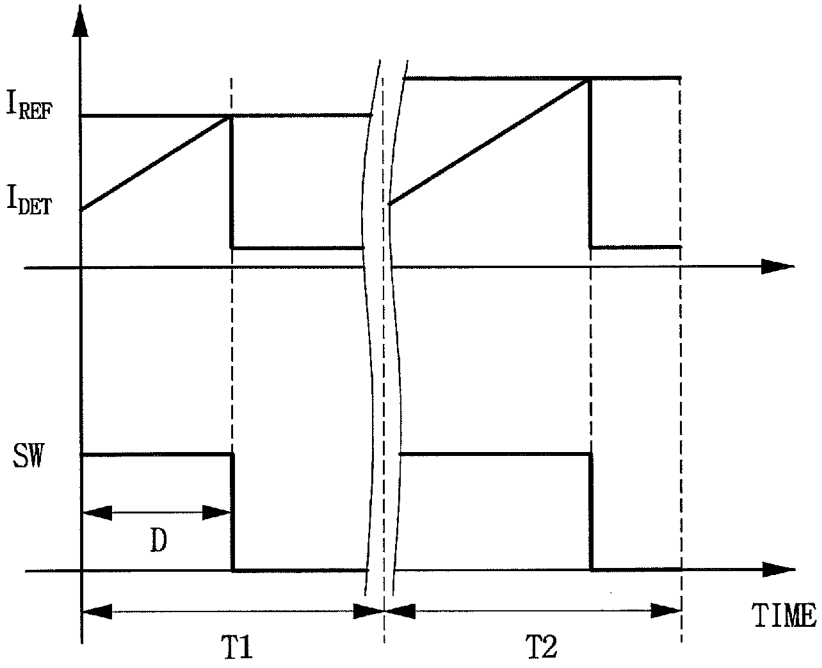
FIG. 2 is a waveform diagram for explaining an operation of the control unit of FIG. 1.

FIG. 2 is a waveform diagram for explaining exemplary operations of the control unit of FIG. 1.

Referring to FIG. 2, when a first period T1 of the clock signal CLK is started, the switching signal SW is activated. The active period D of the switching signal SW is maintained until the detection current $I_{DET}$ becomes equal to the reference current $I_{REF}$. When the detection current $I_{DET}$ becomes equal to the reference current $I_{REF}$, the switching signal SW is inactivated. Meanwhile, a second period T2 of the clock signal CLK corresponds to the case where the LED supply voltage VLED is lowered compared to the first period T1. At this time, a voltage difference between the LED supply voltage VLED and the target voltage increases, and thus the reference current $I_{REF}$ is raised. When the second period T2 of the clock signal CLK is started, the switching signal SW is activated. However, in comparison with the first period T1, a time which it takes the detection current $I_{DET}$ to reach the reference current $I_{REF}$ lengthens, and thus the duty ratio of the switching signal SW increases. As a result, the electromotive force of the coil L1 is further raised during the second period T2, compared to the first period T1.

Figure 3:
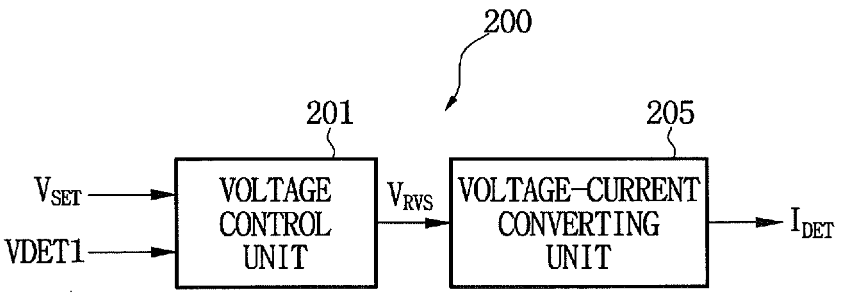
FIG. 3 is a block diagram illustrating an embodiment of the detecting and converting unit of FIG. 1.

FIG. 3 is a block diagram illustrating embodiments of the detecting and converting unit of FIG. 1.

As illustrated in FIG. 3, the detecting and converting unit 200 of the inventive concept includes a voltage control unit 201 and a voltage-current converting unit 205.

The voltage control unit 201 receives both the set voltage $V_{SET}$ from the voltage generating unit 4 and the first detection voltage VDET1 from the LED supply voltage generating unit 1, and generates a reverse voltage $V_{RVS}$ amplified based on a voltage difference between the set voltage $V_{SET}$ and the first detection voltage VDET1. Further, the voltage-current converting unit 205 receives the reverse voltage $V_{RVS}$, converts the received reverse voltage $V_{RVS}$ into the detection current $I_{DET}$, and outputs the converted detection current $I_{DET}$. Here, the reverse voltage $V_{RVS}$ decreases as the first detection voltage VDET1 increases, whereas the reverse voltage $V_{RVS}$ increases as the first detection voltage VDET1 decreases. Further, the detection current $I_{DET}$ decreases as the reverse voltage $V_{RVS}$ increases, whereas the detection current $I_{DET}$ increases as the reverse voltage $V_{RVS}$ decreases.

Figure 4:
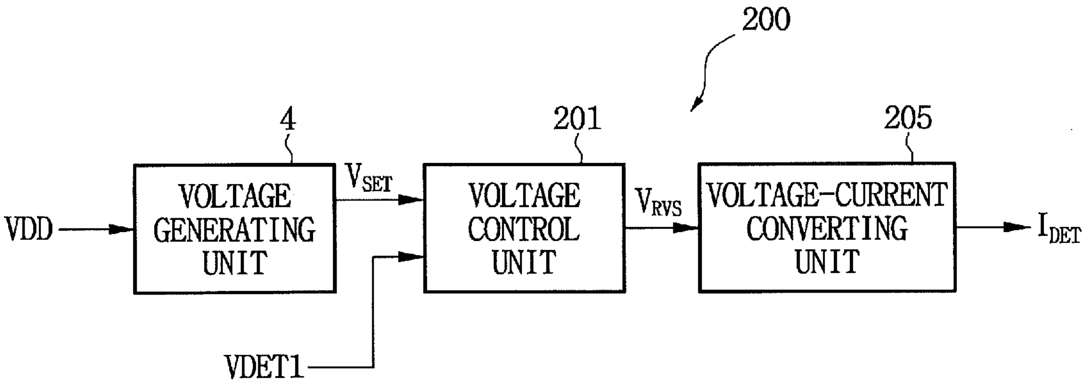
FIG. 4 is a block diagram illustrating another embodiment of the detecting and converting unit of FIG. 1.

FIG. 4 is a block diagram illustrating another embodiment of the detecting and converting unit of FIG. 1.

In the display apparatus of FIG. 1, the voltage generating unit 4 is illustrated to be provided outside the control unit 2. However, as illustrated in FIG. 4, the voltage generating unit 4 may be provided within the detecting and converting unit 200 of the control unit 2. The detecting and converting unit 200 of FIG. 4 has the same operation as that of FIG. 3, and so description thereof will be omitted.

Figure 5:
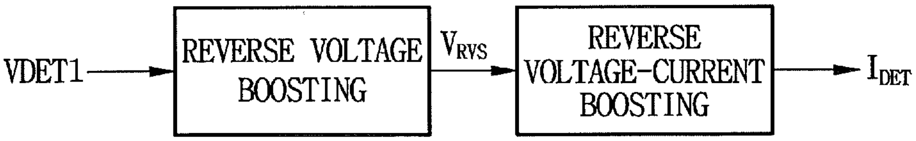
FIG. 5 conceptually illustrates an operation of the detecting and converting unit of FIG. 1.

FIG. 5 conceptually illustrates exemplary operations of the detecting and converting unit of FIG. 1.

First, because the set voltage $V_{SET}$ is fixed at a predetermined level, the voltage difference between the set voltage $V_{SET}$ and the first detection voltage VDET1 is determined based on the change of the first detection voltage VDET1. For this reason, only the first detection voltage VDET1 is represented in FIG. 5.

As illustrated in FIG. 5, the detecting and converting unit 200 generates the reverse voltage $V_{RVS}$, which is reversed relative to the first detection voltage VDET1 and is amplified based on the change of the first detection voltage VDET1, reverses this reverse voltage $V_{RVS}$ again, converts the secondary reverse voltage $V_{RVS}$ into a current, and outputs the detection current $I_{DET}$. In this manner, the detecting and converting unit 200 generates the detection current $I_{DET}$ varying depending on the first detection voltage VDET1.

Figure 6:
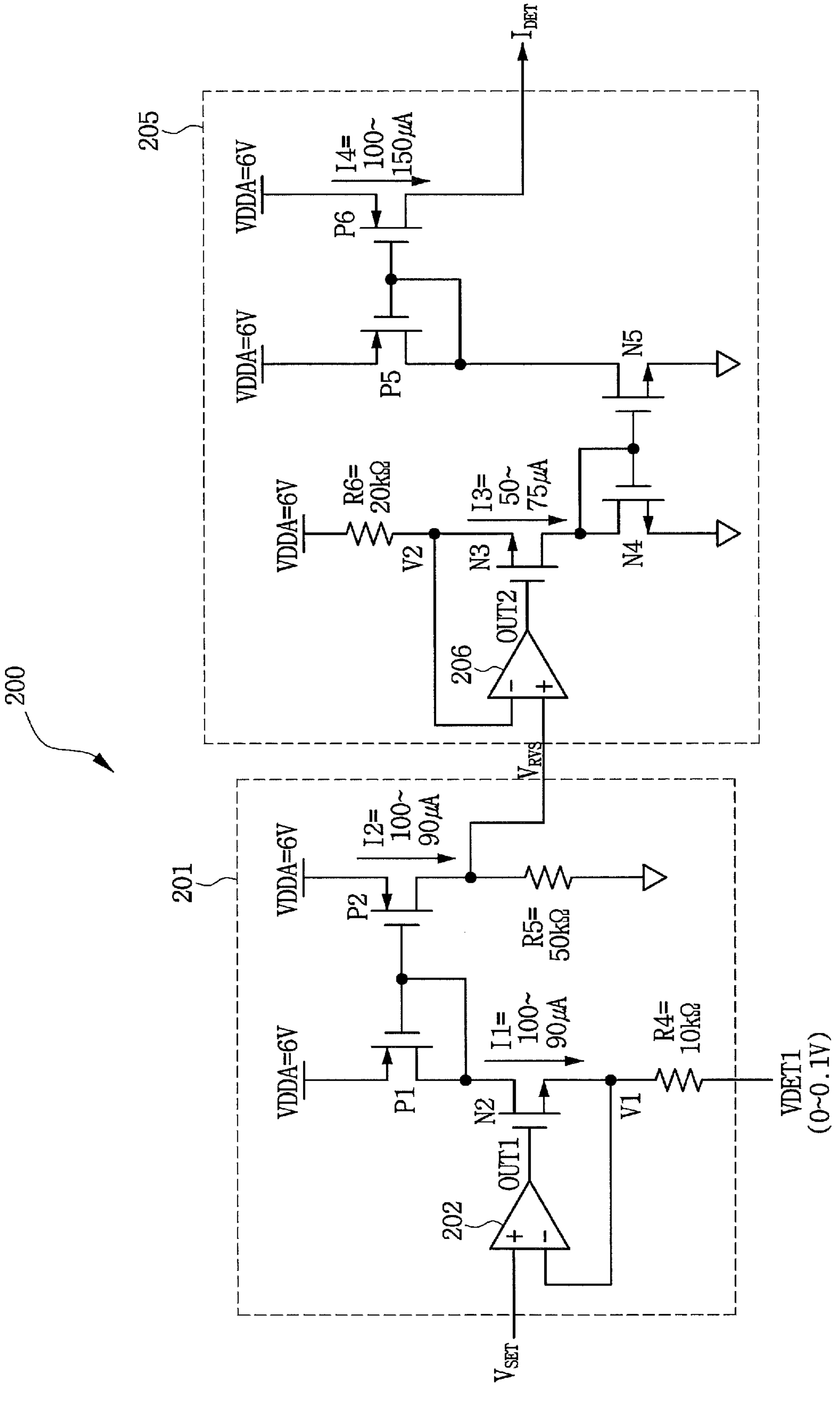
FIG. 6 is a detailed circuit diagram of the detecting and converting unit of FIG. 1.

FIG. 6 is a detailed circuit diagram of the detecting and converting unit of FIG. 1 according to some embodiments.

As illustrated in FIG. 6, the detecting and converting unit 200 includes a voltage control unit 201 and a voltage-current converting unit 205.

Each block of the detecting and converting unit 200 operates as follows according to some embodiments.

First, a first amplifier 202 of the voltage control unit 201 receives the set voltage $V_{SET}$ and first voltage V1, differentially amplifies the set voltage $V_{SET}$ and the first voltage V1, and generates an output signal OUT1. An NMOS transistor N2 adjusts a current in response to the output signal OUT1, and the first voltage V1 becomes equal to the set voltage $V_{SET}$. At this time, a first current I1 flowing through a resistor R4 is adjusted based on a voltage difference between the first voltage V1 and the first detection voltage VDET1. When the first detection voltage VDET1 is input within a range from about 0 V to about 0.1 V, a voltage applied across the resistor R4 varies within a range from about 1 V to about 0.9 V, so that the first current varies within a range from about 100 µA to about 90 µA. Further, p-type metal oxide semiconductor (PMOS) transistors P1 and P2 are set to the same channel size, so that second current flowing through a resistor R5 ranges from about 100 µA to about 90 µA. However, because the resistor R5 has higher resistance than the resistor R4, the reverse voltage $V_{RVS}$ applied across the resistor R5 is raised higher than that applied across the resistor R4, and thus varies within a range from about 5 V to about 4.5 V. Here, the set voltage $V_{SET}$ and the first voltage V1 are fixed at about 1 V, so that the reverse voltage $V_{RVS}$ varies based on the change of the first detection voltage VDET1. Further, the set voltage $V_{SET}$ is set to a higher level than the first detection voltage VDET1. Thus, although the level of the first detection voltage VDET1 is very low, the reverse voltage $V_{RVS}$ is stably generated by a voltage difference between the set voltage $V_{SET}$ and the first detection voltage VDET1 regardless of the level of the first detection voltage VDET1.

In this manner, the voltage control unit 201 amplifies the voltage using the voltage difference between the first detection voltage VDET1 and the set voltage $V_{SET}$ set to the higher level than the first detection voltage VDET1, and outputs the reverse voltage $V_{RVS}$ that is reversed relative to the amplified voltage.

Meanwhile, a second amplifier 206 of the voltage-current converting unit 205 receives the reverse voltage $V_{RVS}$ and second voltage V2, differentially amplifies the reverse voltage $V_{RVS}$ and the second voltage V2, and generates an output signal OUT2. An NMOS transistor N3 adjusts a current in response to the output signal OUT2, and the second voltage V2 becomes equal to the reverse voltage $V_{RVS}$. Further, supply voltage VDDA is about 6 V, and fourth voltage V4 varies within a range from about 5 V to about 4.5 V, so that a third current 13 flowing through a resistor R6 varies within a range from about 50 µA to about 75 µA. At this time, a current equal to the third current 13 flows through a PMOS transistor P5 by a current mirror. A PMOS transistor P6 is set so as to have twice as large a channel size as the PMOS transistor P5, so that fourth current 14 is twice the third current 13. The fourth current 14 is output as the detection current $I_{DET}$. In this manner, the voltage-current converting unit 205 reverses the reverse voltage $V_{RVS}$, converts the reverse voltage $V_{RVS}$ into a current, and outputs the detection current $I_{DET}$.

In summary, the detecting and converting unit 200 receives the first detection voltage VDET1, converts the first detection voltage VDET1 into the detection current $I_{DET}$ through two reversing processes, and outputs the detection current $I_{DET}$.

Meanwhile, voltage, resistance, and current values given to the detecting and converting unit 200 of FIG. 6 are all suggested as one example to explain operational characteristics of the detecting and converting unit 200, and thus the operation of the detecting and converting unit 200 is not limited to the suggested values.

Figure 7:
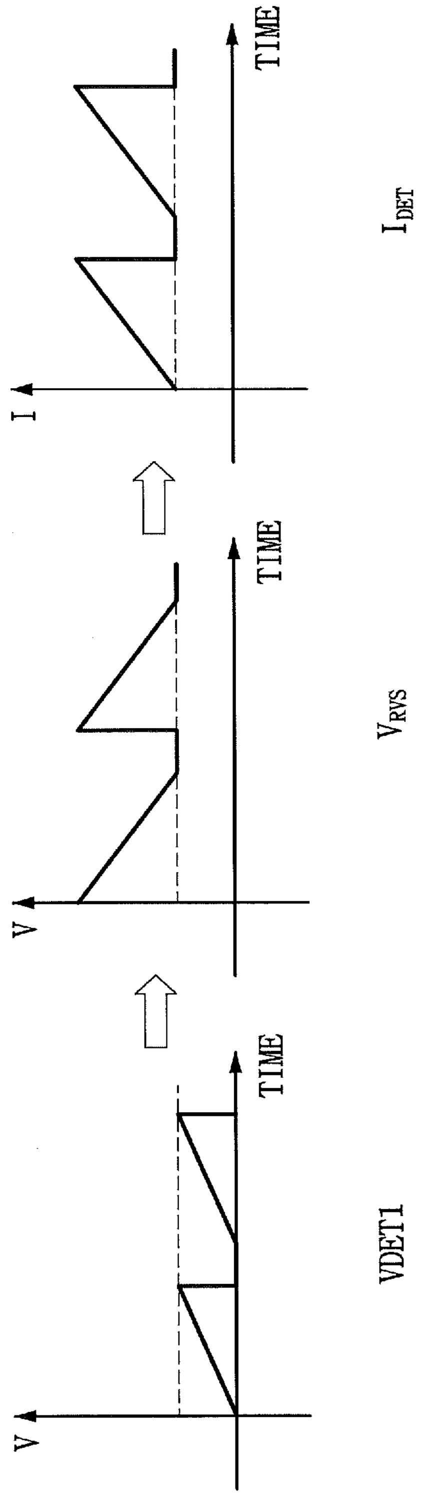
FIG. 7 is a waveform diagram illustrating signals of the detecting and converting unit of FIG. 6.

FIG. 7 is a waveform diagram illustrating signals of the detecting and converting unit of FIG. 6 according to some embodiments.

Referring to FIGS. 1 and 7, when the switching signal SW is activated to a high level, the level of the first detection voltage VDET1 is gradually raised by the coil current $I_L$. However, when the switching signal SW is inactivated to a low level, the coil current $I_L$ flowing to the resistor Rf through the NMOS transistor N1 is interrupted. Thus, the level of the first detection voltage VDET1 is lowered to 0 V, and is maintained at 0 V until the switching signal SW is activated again.

Figure 8:
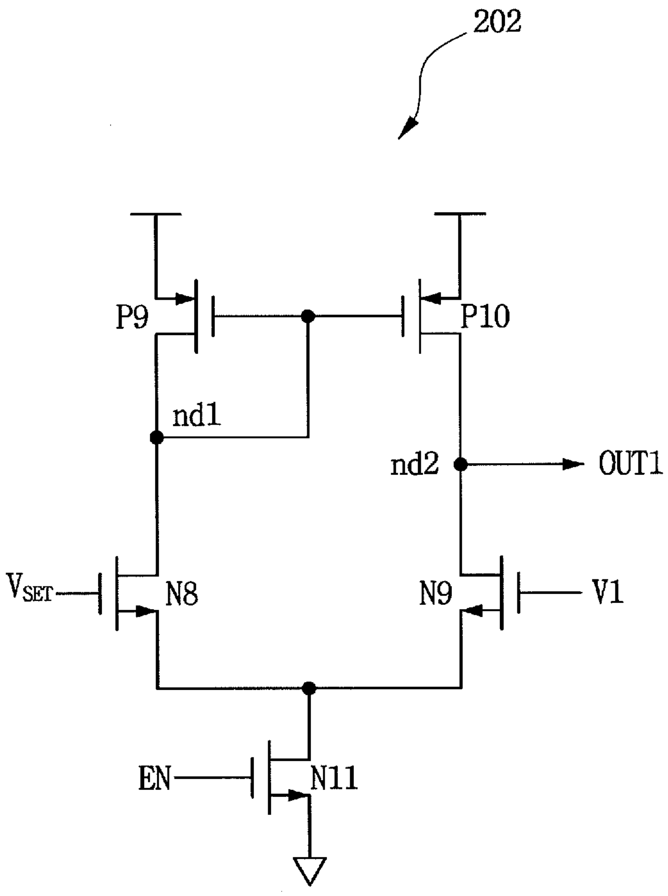
FIG. 8 is a circuit diagram illustrating the first amplifier of the voltage control unit of FIG. 6.

FIG. 8 is a circuit diagram illustrating the first amplifier of the voltage control unit of FIG. 6 according to some embodiments.

The first amplifier 202 differentially amplifies the set voltage $V_{SET}$ and the first voltage V1 to generate the output voltage OUT1. Here, when the set voltage $V_{SET}$ is less than threshold voltage of an NMOS transistor N8, the output voltage OUT 1 varies non-linearly with the set voltage $V_{SET}$ by offset voltage. In contrast, the set voltage $V_{SET}$ applied to the first amplifier 202 is a DC voltage that is fixed at a higher level than the threshold voltage of the NMOS transistor N8, so that the first amplifier 202 can obtain the output voltage OUT1, which linearly varies depending on the voltage difference between the set voltage $V_{SET}$ and the first voltage V1. In this manner, because the first amplifier 202 uses the set voltage $V_{SET}$, which is set so as to be higher than the threshold voltage of the NMOS transistor N8, as an input voltage, the first amplifier 202 operates linearly. Due to the operation of the first amplifier 202, the voltage control unit 201 also operates stably.

Meanwhile, the first amplifier 202 of the voltage control unit 201 has the same configuration as the second amplifier 206 of the voltage-current converting unit 205. The reverse voltage $V_{RVS}$ output from the voltage control unit 201 is generated higher than threshold voltage of the NMOS transistor of the second amplifier 206. Thus, the second amplifier 206, which uses the reverse voltage $V_{RVS}$ as input voltage, also operates linearly. Due to the operation of the second amplifier 206, the voltage-current converting unit 205 also operates stably.

As described above, the display apparatus according to the first embodiment of the inventive concept receives the second detection voltage VDET2 varying based on the coil current $I_L$ and the second detection voltage VDET2 varying based on the LED supply voltage VLED, and converts the detection current $I_{DET}$ and the reference current $I_{REF}$ respectively. The display apparatus adjusts the active period of the switching signal SW according to the result of comparing the detection current $I_{DET}$ and the reference current $I_{REF}$, and controls the LED supply voltage VLED to be maintained constant. At this time, the display apparatus stably operates the voltage detecting and current generating unit 20, which converts the first detection voltage VDET1 into the detection current $I_{DET}$, regardless of the level of the first detection voltage VDET1, thereby allowing the LED supply voltage VLED to be stably maintained constant.

Figure 9:
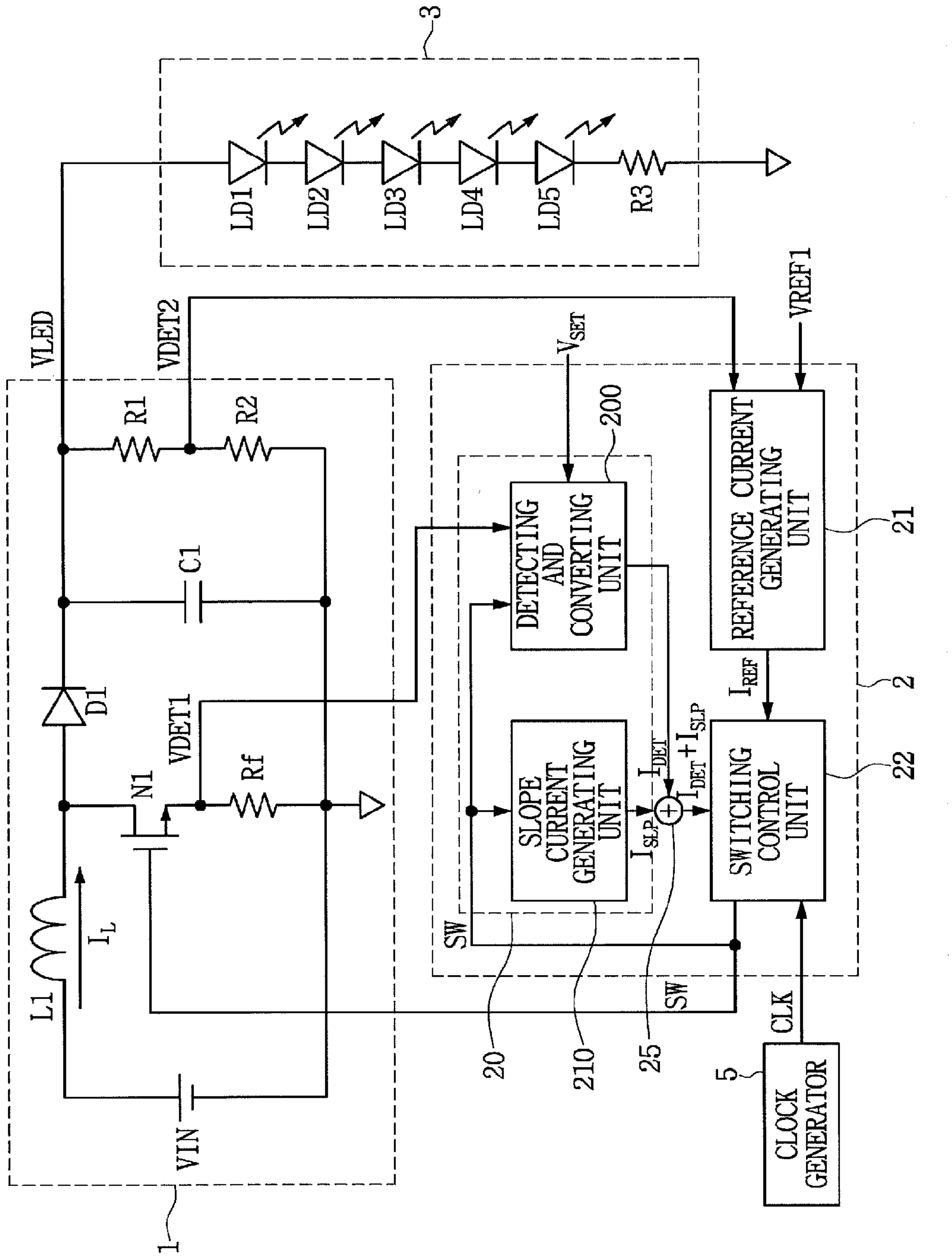
FIG. 9 illustrates a display apparatus according to a second example embodiment of the inventive concept.

FIG. 9 illustrates a display apparatus according to a second embodiment of the inventive concept.

As illustrated in FIG. 9, the display apparatus according to a second embodiment of the inventive concept includes an LED supply voltage generating unit 1, a control unit 2, a lighting unit 3, and a clock generating unit 5. Here, the control unit 2 includes a voltage detecting and current generating unit 20, a reference current generating unit 21, and a switching control unit 22. The voltage detecting and current generating unit 20 includes a detecting and converting unit 200 and a slope current generating unit 210.

In the control unit 2, exemplary operations of each block will be described below.

Parts overlapping with the control unit of FIG. 2 will be omitted or described in brief.

First, the detecting and converting unit 200 of the voltage detecting and current generating unit 20 detects first detection voltage VDET1 varying based on coil current $I_L$, converts the first detection voltage VDET1 into detection current $I_{DET}$, and outputs the detection current $I_{DET}$. Thus, the detection current $I_{DET}$ also varies based on the coil current $I_L$. The slope current generating unit 210 generates slope compensation current $I_{SLP}$ during the active period of a switching signal SW to compensate for a distortion of the detection current $I_{DET}$. The slope compensation current $I_{SLP}$ is added to the detection current $I_{DET}$, and the compensated detection current $I_{DET}+I_{SLP}$ is input to the switching control unit 22. Because this compensated detection current $I_{DET}+I_{SLP}$ varies based on the coil current $I_L$, it is possible to detect a change in electromotive force of a coil L1 through the compensated detection current $I_{DET}+I_{SLP}$. In detail, an increase in the compensated detection current $I_{DET}+I_{SLP}$ during the active period of the switching signal SW means that the electromotive force of the coil L1 increases. Likewise, a decrease in the compensated detection current $I_{DET}+I_{SLP}$ during the active period of the switching signal SW means that the electromotive force of the coil L1 decreases.

Meanwhile, the detecting and converting unit 200 and the slope current generating unit 210, both of which constitute the voltage detecting and current generating unit 20, control voltage and current in response to the switching signal SW. In detail, the detecting and converting unit 200 and the slope current generating unit 210 are operated by the voltage and current received during the active period of the switching signal SW, and interrupt the voltage and current when the switching signal SW is inactivated, thereby reducing power consumption.

Next, the reference current generating unit 21 compares the LED supply voltage VLED with the target voltage using the second detection voltage VDET2 and first reference voltage VREF1, and generates the reference current $I_{REF}$ for adjusting a duty ratio of the switching signal SW output from the switching control unit 22. More specifically, the reference current generating unit 21 increases the reference current $I_{REF}$ as a voltage difference between the first reference voltage VREF1 and the second detection voltage VDET2 increases, and decreases the reference current $I_{REF}$ as the voltage difference decreases. Meanwhile, when the second detection voltage VDET2 reaches the first reference voltage VREF 1, the reference current generating unit 21 maintains the reference current $I_{REF}$ constant. Here, the reference current generating unit 21 may be implemented as an OTA, which converts a difference between two voltages into a current.

Next, the switching control unit 22 compares the compensated detection current $I_{DET}+I_{SLP}$ with the reference current $I_{REF}$, and generates the switch signal SW, whose period is identical to that of a clock signal CLK, and whose duty ratio is adjusted. More specifically, the switching control unit 22 activates the switching signal SW in response to the clock signal CLK. Further, when the compensated detection current $I_{DET}+I_{SLP}$ is less than the reference current $I_{REF}$, the switching control unit 22 determines that the electromotive force of the coil L1 is still insufficient to raise the LED supply voltage VLED to the target voltage, and thus continues to maintain the active period of the switching signal SW. In contrast, when the compensated detection current $I_{DET}+I_{SLP}$ becomes equal to the reference current $I_{REF}$, the switching control unit 22 determines that the electromotive force of the coil L1 is sufficient to raise the LED supply voltage VLED to the target voltage, and thus inactivates the switching signal SW.

Next, the clock generating unit 5 generates the clock signal CLK having the same period as the switching signal SW. The clock generating unit 5 may be provided within the control unit 2.

Figure 10:
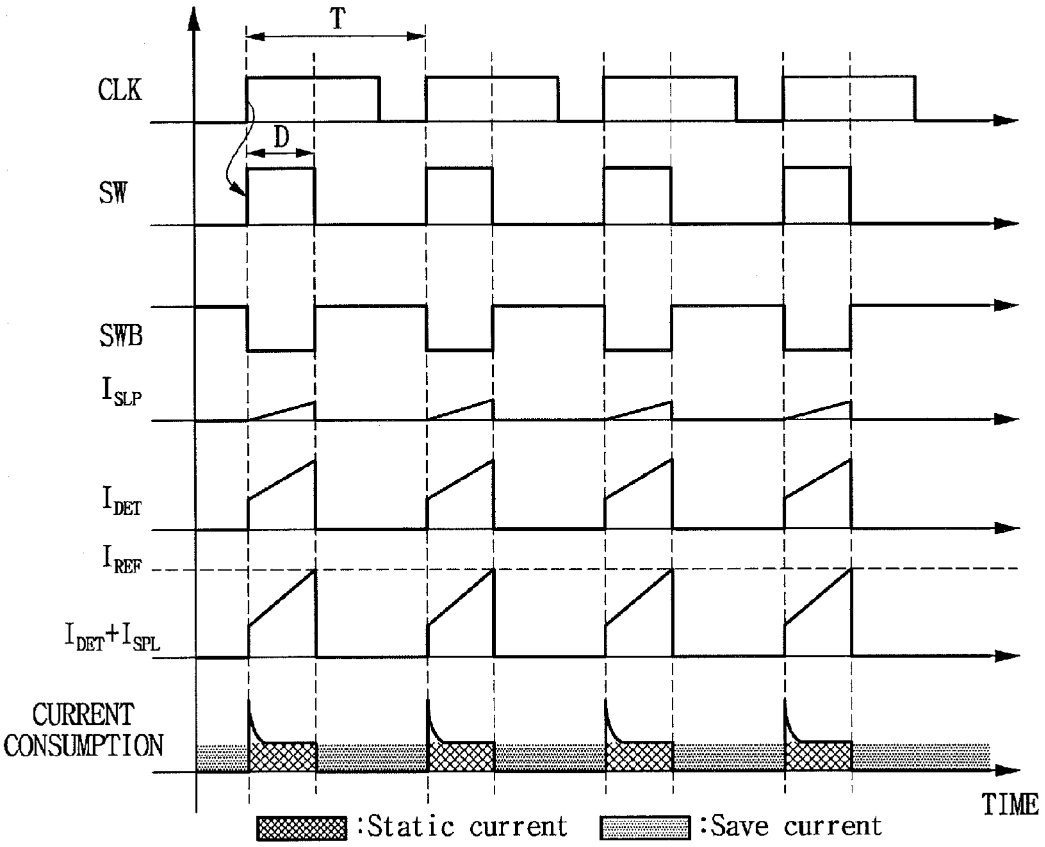
FIG. 10 is a waveform diagram for explaining an operation of the control unit of FIG. 9.

FIG. 10 is a waveform diagram for explaining exemplary operations of the control unit of FIG. 9.

First, the switching control unit 22 activates the switching signal SW to a high level in response to a rising edge of the clock signal CLK. When the switching signal SW is activated, an NMOS transistor N1 of the LED supply voltage generating unit 1 is turned on, and the first detection voltage VDET1 is raised by the coil current IL flowing through the NMOS transistor N1. At this time, the first detection voltage VDET1 begins to be raised from a predetermined voltage level by a resistor Rf.

Meanwhile, when the switching signal SW is activated, the detecting and converting unit 200 starts to detect the first detection voltage VDET1 and convert the first detection voltage VDET1 into the detection current $I_{DET}$. Further, when the switching signal SW is activated, the slope current generating unit 210 starts to generate the slope compensation current $I_{SLP}$ during the active period of the switching signal SW. The slope compensation current $I_{SLP}$ is added to the detection current $I_{DET}$, and the compensated detection current $I_{DET}+I_{SLP}$ is input to the switching control unit 22.

The switching control unit 22 continues to maintain the activated state of the switching signal in a period where the compensated detection current $I_{DET}+I_{SLP}$ is less than the reference current $I_{REF}$, and inactivates the switching signal SW when the compensated detection current $I_{DET}+I_{SLP}$ reaches the reference current $I_{REF}$. At this time, the detecting and converting unit 200 interrupts voltage and current received in response to the inactivated switching signal SW. Thus, the detecting and converting unit 200 stops converting the first detection voltage VDET1 into the detection current $I_{DET}$. Further, the slope current generating unit 210 interrupts voltage and current received in response to the inactivated switching signal SW, and stops generating the slope compensation current $I_{SLP}$.

Meanwhile, it is shown on a lower side of FIG. 10 how static current of the voltage detecting and current generating unit 20 is consumed. The static current is consumed only during the active period of the switching signal SW. Thus, when the switching signal SW is inactivated, the static current is reduced, so that power consumption is reduced. Particularly, among the static current consumed in the entire control unit 2, the static current consumed in the voltage detecting and current generating unit 20 occupies a high percentage. As such, the power consumption of the entire control unit 2 is considerably reduced by reducing the consumption of the static current of the voltage detecting and current generating unit 20.

Figure 11:
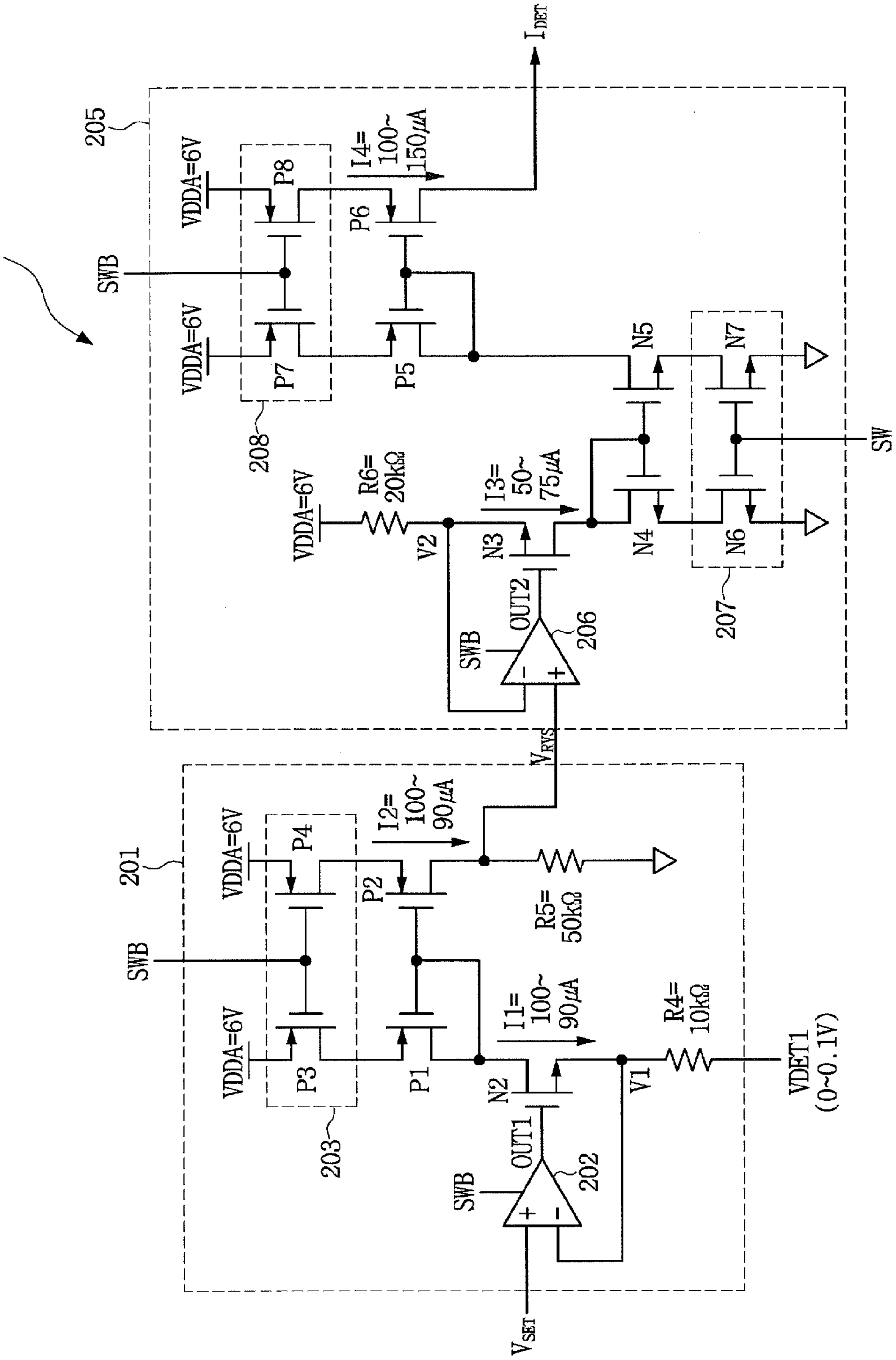
FIG. 11 is a circuit diagram illustrating the detecting and converting unit of FIG. 9.

FIG. 11 is a circuit diagram illustrating the detecting and converting unit of FIG. 9 according to some embodiments.

The detecting and converting unit 200 of FIG. 11 is fundamentally similar to that of the first embodiment shown in FIG. 6, and so only differences in configuration will be described.

The voltage control unit 201 of the detecting and converting unit 200 includes a first voltage control unit 203 controlling supply of supply voltage VDDA, which is applied to the voltage control unit 201, in response to a switching reverse signal SWB. Here, the switching reverse signal SWB is a signal that reverses the switching signal SW. When the switching reverse signal SWB is activated to a low level, PMOS transistors P3 and P4 are turned on, and thus the first voltage control unit 203 applies the supply voltage VDDA to the voltage control unit 201 through the PMOS transistors P3 and P4. In contrast, when the switching reverse signal SWB is inactivated to a high level, the PMOS transistors P3 and P4 are turned off, and thus the first voltage control unit 203 interrupts the supply voltage VDDA applied to the voltage control unit 201, so that the operation of the voltage control unit 201 is stopped. Thus, the PMOS transistors P3 and P4 may be viewed as a power interface circuit that is operable to connect the voltage control unit 201 to the power supply voltage.

Next, the voltage-current converting unit 205 includes a second voltage control unit 207 controlling supply of the supply voltage VDDA in response to the switching signal SW, and a third voltage control unit 208 controlling supply of the supply voltage VDDA in response to the switching reverse signal SWB. First, when the switching signal SW is activated, NMOS transistors N6 and N7 are turned on, and thus the second voltage control unit 207 applies the supply voltage VDDA to the voltage-current converting unit 205 through the NMOS transistors N6 and N7. In contrast, when the switching signal SW is inactivated, the NMOS transistors N6 and N7 are turned off, and thus the supply of the supply voltage VDDA is stopped by the NMOS transistors N6 and N7. Further, when the switching reverse signal SWB is activated, PMOS transistors P7 and P8 are turned on, and thus the third voltage control unit 208 applies the supply voltage VDDA to the voltage-current converting unit 205. In contrast, when the switching reverse signal SWB is inactivated, the PMOS transistors P7 and P8 are turned off, and thus the supply of the supply voltage VDDA is stopped by the PMOS transistors P7 and P8. Thus, the NMOS transistors N6 and N7 and PMOS transistors P7 and P8 may be viewed as power interface circuits that are operable to connect the voltage-current converting unit 205 to the power supply voltage In this manner, the detecting and converting unit 200 receives the supply voltage VDDA only during the active period of the switching signal SW through the first, second and third voltage control units 203, 207 and 208, and stops the supply of the supply voltage NDDA when the switching signal SW is inactivated so as to prevent unnecessary power consumption.

Figure 12:
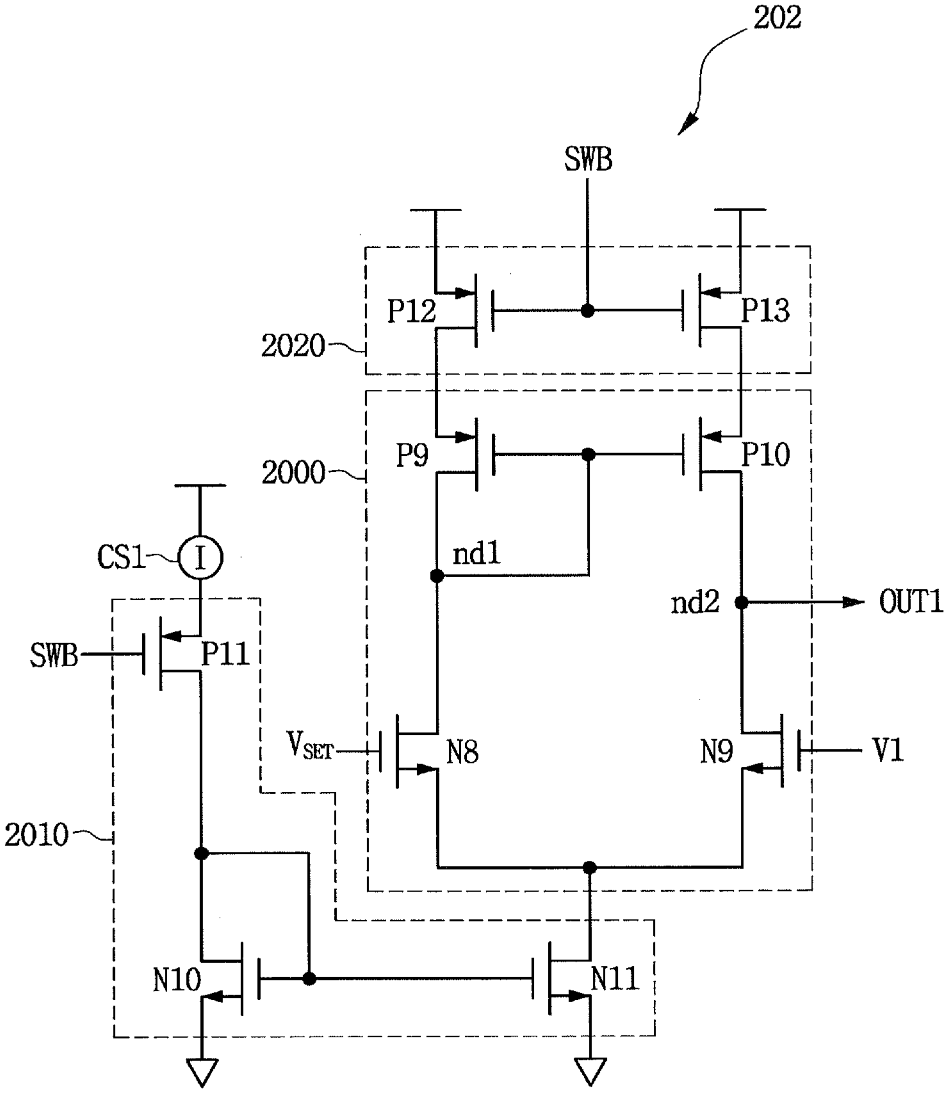
FIG. 12 is a circuit diagram illustrating the first amplifier of FIG. 11.

FIG. 12 is a circuit diagram illustrating the first amplifier of FIG. 11 according to some embodiments.

As illustrated in FIG, 12, the first amplifier 202 includes an amplifying unit 2000, a current control unit 2010, and a fourth voltage control unit 2020.

The amplifying unit 2000 receives both a set voltage $V_{SET}$ higher than threshold voltage of an NMOS transistor N8 and first voltage V1, and differentially amplifies a voltage difference between the set voltage $V_{SET}$ and the first voltage V1. The current control unit 2010 applies or interrupts a current to or from the amplifying unit 2000 in response to the switching reverse signal SWB. In detail, when the switching signal SW is activated to a high level, the switching reverse signal SWB is activated to a low level, and thus the current of a current source CS1 flows to an NMOS transistor N10 through a PMOS transistor P11. Further, the current flows to an NMOS transistor N11 by a current mirror. As a result, the current flows to the amplifying unit 2000 through the NMOS transistor N11, Meanwhile, the fourth voltage control unit 2020 applies a voltage to the amplifying unit 2000 in response to the switching reverse signal SWB. In detail, when the switching signal SW is activated to a high level, the switching reverse signal SWB is activated to a low level, PMOS transistors P12 and P13 are turned on, and thus the voltage is applied to the amplifying unit 2000.

In this manner, the first amplifier 202 applies the current to the amplifying unit 2000 through the current control unit 2010 during the active period of the switching signal SW, and applies the voltage to the amplifying unit 2000 through the fourth voltage control unit 2020. Thus, the first amplifier 202 performs the differential amplification. In contrast, when the switching signal SW is inactivated, both the current and the voltage are interrupted by the current control unit 2010 and the fourth voltage control unit 2020, so that the first amplifier 202 can avoid unnecessary power consumption. In other words, the first amplifier 202 is powered during the active period of the switching signal SW, and thus performs normal differential amplification.

In the embodiment of FIG. 12, the first amplifier 202 is illustrated to have both the current control unit 2010 and the fourth voltage control unit 2020. Alternatively, the first amplifier 202 may include selectively only one of the current control unit 2010 and the fourth voltage control unit 2020.

Meanwhile, in the detecting and converting unit 200, the first amplifier 202 has the same configuration as the second amplifier 206. As such, the second amplifier 206 also receives supply voltage and current only during the active period of the switching signal SW, and thus to performs normal differential amplification during the active period of the switching signal SW.

Figure 13:
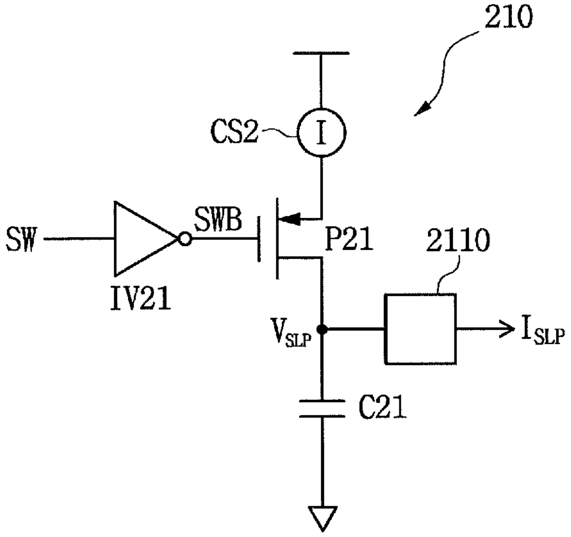
FIG. 13 is a circuit diagram illustrating the slope compensating unit of FIG. 9.

FIG. 13 is a circuit diagram illustrating the slope compensating unit of FIG. 9 according to some embodiments.

Referring to FIG. 13, when the switching signal SW is activated to a high level, a PMOS transistor P21 is turned on, and thus a current is supplied. Thus, a slope voltage $V_{SLP}$, which is generated by a capacitor C21, increases. The slope voltage $V_{SLP}$ is converted into a slope compensation current $I_{SLP}$ by a voltage-current converter 2110. In detail, the slope compensation current $I_{SLP}$ increases due to a current flowing from a current source CS2 during the active period of the switching signal SW. In contrast, when the switching signal SW is inactivated to a low level, the PMOS transistor P21 is turned off, and thus the current is not supplied. Thus, the slope compensation current $I_{SLP}$ is not generated. In this manner, the slope compensating unit 210 generates the slope compensation current $I_{SLP}$ only during the active period of the switching signal SW.

Figure 14:
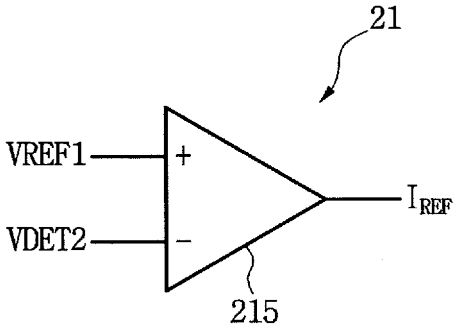
FIG. 14 is a circuit diagram illustrating the reference current generating unit of FIG. 9.

FIG. 14 is a circuit diagram illustrating the reference current generating unit of FIG. 9 according to some embodiments.

As illustrated in FIG. 14, the reference current generating unit 21 includes an amplifier 215.

The amplifier 215 compares the LED supply voltage VLED with the target voltage using the second detection voltage VDET2 and the first reference voltage VREF1, and generates reference current $I_{REF}$ for adjusting the duty ratio of the switching signal SW. The amplifier 215 increases the reference current $I_{REF}$ in proportion to a voltage difference between the second detection voltage VDET2 and the first reference voltage VREF1, and decreases the reference current $I_{REF}$ in inverse proportion to the voltage difference between the second detection voltage VDET2 and the first reference voltage VREF1. More specifically, as the second detection voltage VDET2 becomes lower than the first reference voltage VREF1, the amplifier 215 increases the reference current $I_{REF}$. As the second detection voltage VDET2 becomes close to the first reference voltage VREF1, the amplifier 215 lowers the reference current $I_{REF}$. Here, the amplifier 215 may be implemented as an OTA.

Figure 15:
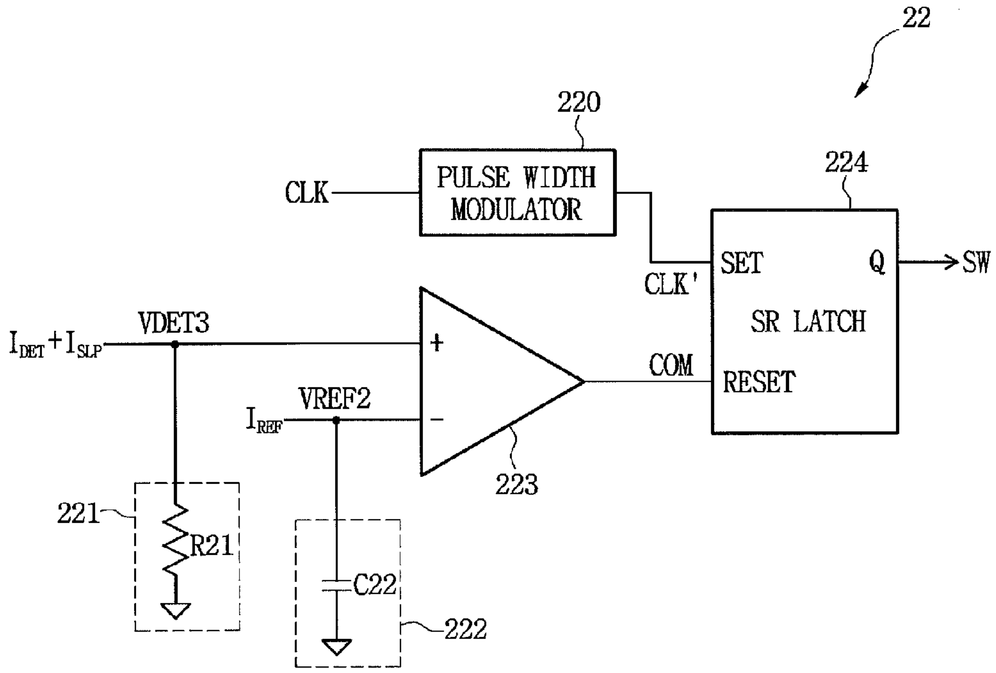
FIG. 15 is a circuit diagram illustrating the switching control unit of FIG. 9.

FIG. 15 is a circuit diagram illustrating the switching control unit of FIG. 9 according to some embodiments.

As illustrated in FIG. 15, the switching control unit 22 includes a pulse width modulator 220, a first voltage converter 221, a second voltage converter 222, a comparator 223, and an SR latch where S and R stand for "set" and "reset" respectively.

In the switching control unit 22, an operation of each block will be described below.

First, the pulse width modulator 220 modulates a pulse width of the clock signal CLK input from the clock generating unit 5 to generate another clock signal CLK' having another pulse width. The first voltage converter 221 includes a resistor R21, and converts the compensated detection current $I_{DET}+I_{SLP}$ input from the detecting and converting unit 200 into a third detection voltage VDET3 by the resistor R21. Further, a second voltage converter 222 includes a capacitor C22, and converts the reference current $I_{REF}$ input from the reference current generating unit 21 into second reference voltage VREF2 by the capacitor C22.

Meanwhile, the comparator 223 compares the third detection voltage VDET3 with the second reference voltage VREF2 to generate a comparison signal COM. In detail, when the third detection voltage VDET3 is lower than the second reference voltage VREF2, the comparator 223 generates the comparison signal COM having a low level. When the third detection voltage VDET3 reaches the second reference voltage VREF2, the comparator 223 generates the comparison signal COM having a high level.

The SR latch 224 generates the switching signal SW in response to the clock signal CLK' and the comparison signal COM. In detail, when the clock signal CLK' is set to the high level, the SR latch 224 activates the switching signal SW to the high level. Then, when the third detection voltage VDET3 reaches the second reference voltage VREF2, and thus the comparison signal COM is set to the high level, the SR latch 224 inactivates the switching signal SW to the low level. Here, the SR latch 224 is assumed to be configured of NOR gates.

In this manner, the switching control unit 22 receives the compensated detection current $I_{DET}+I_{SLP}$ varying based on the coil current $I_L$, the second reference voltage VREF2 varying based on the LED supply voltage VLED, and the clock signal CLK', activates the switching signal SW in response to the clock signal CLK', and holds the activated state until the third detection voltage VDET3 reaches the second reference voltage VREF2.

Figure 16:
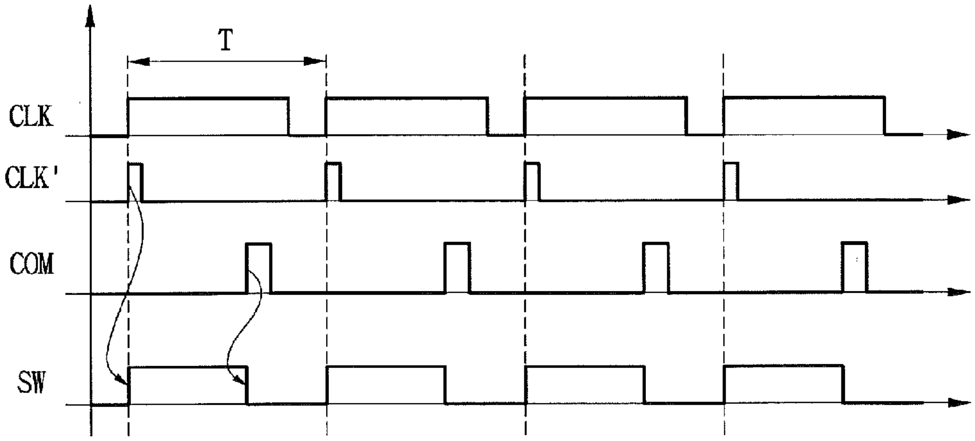
FIG. 16 is a waveform diagram for explaining an operation of the circuit of FIG. 15.

FIG. 16 is a waveform diagram for explaining exemplary operations of the circuit of FIG. 15.

When the clock signal CLK' is input into the SR latch 224, the SR latch 224 activates the switching signal SW in response to a rising edge of the clock signal CLK'. When third detection voltage VDET3 reaches the second reference voltage VREF2 and thus the comparator 223 outputs the high-level comparison signal COM, the SR latch 224 inactivates the switching signal SW in response to a rising edge of the comparison signal COM. In other words, the switching control unit 22 generates the switching signal SW which is activated and held in this state when the clock signal CLK' is generated and is inactivated when the comparison signal COM is generated.

As described above, the display apparatus according to the second embodiment of the inventive concept receives the first detection voltage VDET1 varying based on the coil current $I_L$ and the second detection voltage VDET2 varying based on the LED supply voltage VLED, and converts the detection current $I_{DET}$ and the reference current $I_{REF}$ respectively. The display apparatus adjusts the active period of the switching signal SW according to the result of comparing the detection current $I_{DET}$ with the reference current $I_{REF}$, and controls the LED supply voltage VLED to be maintained constant. Particularly, the voltage detecting and current generating unit 20 of the second embodiment receives the voltage and current only during the active period of the switching signal in which the effective operation is substantially performed, and interrupts the voltage and current during the inactive period of the switching signal SW, thereby reducing unnecessary power consumption.

In the second embodiment of the inventive concept, both the voltage and the current are configured to be controlled. The voltage control and the current control may be selectively applied as needed by a user.

Figure 17:
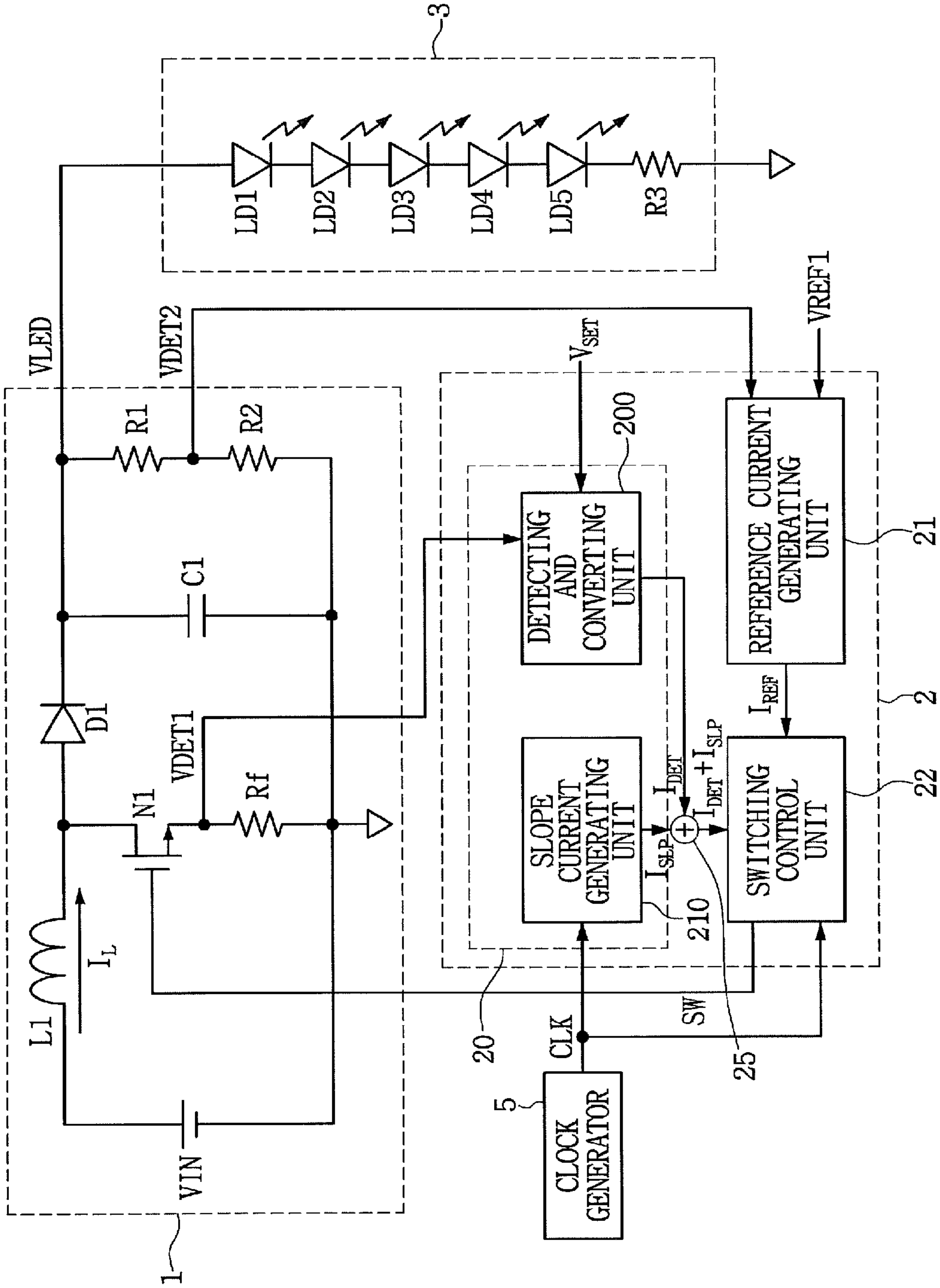
FIG. 17 illustrates a display apparatus according to a third embodiment of the inventive concept.

FIG. 17 illustrates a display apparatus according to a third embodiment of the inventive concept.

As illustrated in FIG. 17, the display apparatus according to a third embodiment of the inventive concept includes a LED supply voltage generating unit 1, a control unit 2, a lighting unit, and a clock generating unit 5. Here, the control unit 2 includes a voltage detecting and current generating unit 20, a reference current generating unit 21, and a switching control unit 22. The voltage detecting and current generating unit 20 includes a detecting and converting unit 200 and a slope current generating unit 210.

In the control unit 20, exemplary operations of each block will be described below.

Parts overlapping with the control unit of FIG. 9 will be omitted or described in brief.

First, the detecting and converting unit 200 of the voltage detecting and current generating unit 20 detects first detection voltage VDET1 varying based on coil current $I_L$, converts the first detection voltage VDET1 into the detection current $I_{DET}$, and outputs the detection current $I_{DET}$. Thus, the detection current $I_{DET}$ also varies based on the coil current $I_L$. The slope current generating unit 210 generates and outputs slope current $I_{SLP}$ in response to a clock signal CLK. Here, the output slope current $I_{SLP}$ and detection current $I_{DET}$ are added and input into the switching control unit 22 as compensated detection current $I_{DET}+I_{SLP}$. Because this compensated detection current $I_{DET}+I_{SLP}$ varies depending on the coil current $I_L$, it is possible to detect a change in electromotive force of a coil L1 through the compensated detection current $I_{DET}+I_{SLP}$. In detail, an increase of the compensated detection current $I_{DET}+I_{SLP}$ means that the electromotive force of the coil L1 increases. Likewise, a decrease of the compensated detection current $I_{DET}+I_{SLP}$ means that the electromotive force of the coil L1 decreases.

In the second embodiment, the detecting and converting unit 200 and the slope current generating unit 210 control the voltage and current in response to the switching signal SW.

However, in the third embodiment, the slope current generating unit 210 controls the current in response to the clock signal CLK.

Next, the reference current generating unit 21 compares LED supply voltage VLED with target voltage using second detection voltage VDET2 and first reference voltage VREF1, and generates reference current $I_{REF}$ for adjusting a duty ratio of the switching signal SW output from the switching control unit 22. More specifically, the reference current generating unit 21 increases the reference current $I_{REF}$ as a voltage difference between the first reference voltage VREF1 and the second detection voltage VDET2 increases, and decreases the reference current $I_{REF}$ as the voltage difference decreases. Meanwhile, when the second detection voltage VDET2 reaches the first reference voltage VREF1, the reference current generating unit 21 maintains the reference current $I_{REF}$ constant. Here, the reference current generating unit 21 may be implemented as an OTA, which converts a difference between two voltages into a current.

The switching control unit 22 compares the compensated detection current $I_{DET}+I_{SLP}$ with the reference current $I_{REF}$, and generates the switch signal SW, whose period is identical to that of the clock signal CLK, and whose duty ratio is adjusted. More specifically, the switching control unit 22 activates the switching signal SW in response to the clock signal CLK. Further, when the compensated detection current $I_{DET}+I_{SLP}$ is less than the reference current $I_{REF}$, the switching control unit 22 determines that the electromotive force of the coil L1 is still insufficient to raise the LED supply voltage VLED to the target voltage, and thus continues to maintain the active period of the switching signal SW. In contrast, when the compensated detection current $I_{DET}+I_{SLP}$ becomes equal to the reference current $I_{REF}$, the switching control unit 22 determines that the electromotive force of the coil L1 is sufficient to raise the LED supply voltage VLED to the target voltage, and thus inactivates the switching signal SW.

Next, the clock generating unit 5 generates the clock signal CLK. The clock generating unit 5 may be provided within the control unit 2. A pulse width of the clock signal CLK may be variously set as needed by a user.

Figure 18:
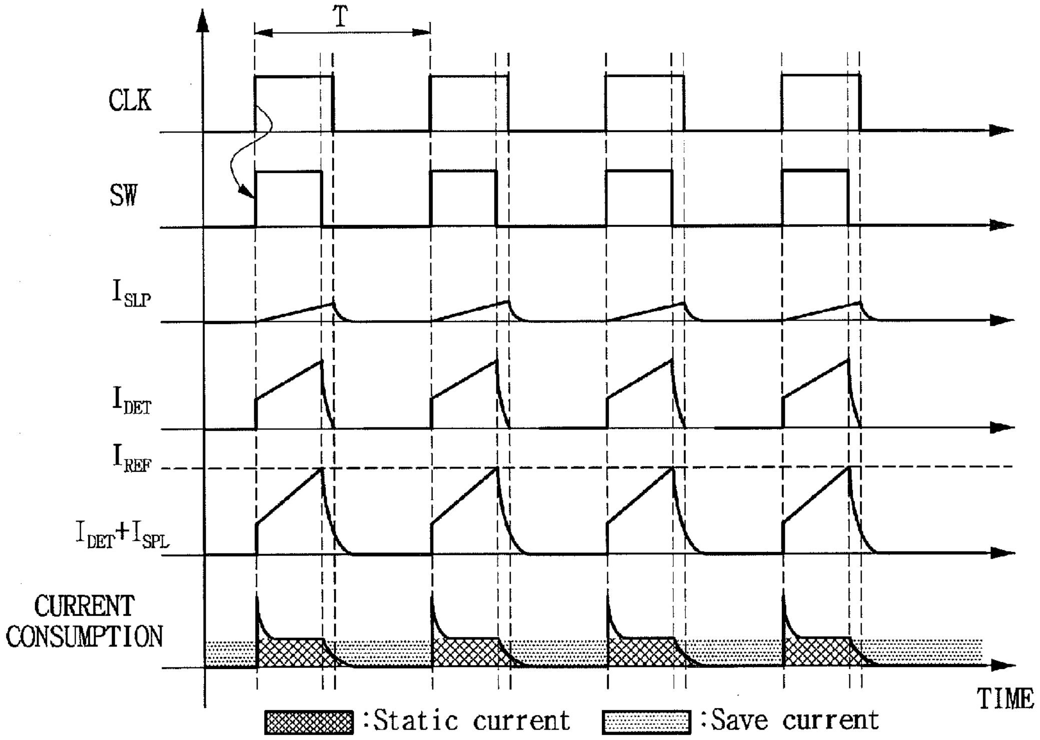
FIG. 18 is a waveform diagram for explaining an operation of the control unit of FIG. 17.

FIG. 18 is a waveform diagram for explaining exemplary operations of the control unit of FIG. 17.

First, when the switching control unit 22 activates the switching signal SW to a high level in response to a rising edge of the clock signal CLK, an NMOS transistor N1 is turned on. Thus, the first detection voltage VDET1 is raised by the coil current $I_L$ entering through the NMOS transistor N1, and the detection current $I_{DET}$ generated by the detecting and converting unit 200 increases gradually. Meanwhile, the slope current generating unit 210 generates and outputs the slope current $I_{SLP}$ during a high-level period, i.e. an active period, of the clock signal CLK.

Afterwards, when the compensated detection current $I_{DET}+I_{SLP}$ becomes equal to the reference current $I_{REF}$, and thus the switching control unit 22 inactivates the switching signal SW, the first detection voltage VDET1 becomes 0 V. However, the detection current $I_{DET}$ is slowly lowered to 0 A rather than immediately. This phenomenon is called tailing. After the switching signal SW is inactivated, the slope current generating unit 210 may generate the slope current $I_{SLP}$ during an additional predetermined period. When the active period of the clock signal CLK is terminated, the slope current generating unit 210 stops generating the slope current $I_{SLP}$. Because the slope current $I_{SLP}$ continues to be generated to compensate for the detection current $I_{DET}$ during the active period of the switching signal SW, the active period of the clock signal CLK needs to be at least set so as to be longer than the active period of the switching signal SW. Actually, the active period of the clock signal CLK may be set so as to limit a peak of the duty ratio of the switching signal SW, and allow the clock generating unit 5 to generate the clock signal CLK having an active period longer than or equal to the active period of the switching signal SW.

Meanwhile, the clock signal CLK is inactivated to a low level and the tailing of the slope current $I_{SLP}$ takes place. This tailing is gradually removed over time. As such, the tailing may be removed before the following clock signal CLK is generated by adjusting the active period of the clock signal CLK. If a period in which the slope current $I_{SLP}$ is generated increases excessively, a tailing component of the slope current $I_{SLP}$ may be added to the detection current $I_{DET}$ without being completely removed after another period of the switching signal SW has been initiated. At this time, a component corresponding to the sum of the detection current $I_{DET}$ and the slope current $I_{SLP}$ may abruptly appear to exceed the reference current $I_{REF}$. This component is referred to as peak noise. When this peak noise takes place, the active period of the switching signal SW is terminated in its early stage, so that the duty ratio of the switching signal SW can be distorted, and the LED supply voltage generating unit 1 may cause a malfunction. In this manner, the slope current generating unit 210 generates the slope current $I_{SLP}$ in response to the clock signal CLK having the active period set to a predetermined pulse width, so that it is possible to prevent or reduce the peak noise caused by the tailing of the slope current $I_{SLP}$. Accordingly, it is possible to prevent or reduce the likelihood of malfunction of the display apparatus.

Further, the slope current $I_{SLP}$ is generated only during the active period of one period of the clock signal CLK, so that it is possible to reduce consumption of static current as illustrated on the lower side of FIG. 18.

Figure 19:
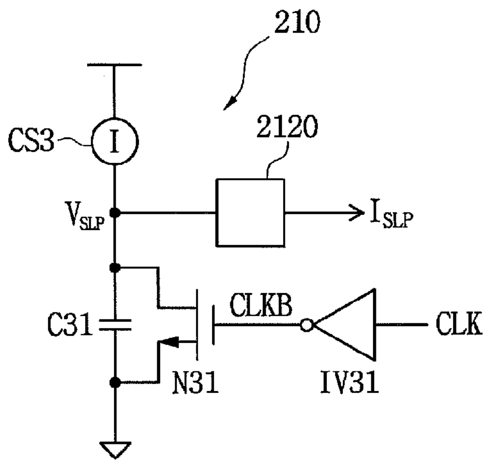
FIG. 19 is a circuit diagram illustrating the slope current generating unit of FIG. 17.

FIG. 19 is a circuit diagram illustrating the slope current generating unit of FIG. 17 according to some embodiments.

The slope current generating unit 210 controls a current in response to the clock signal CLK, thereby controlling generation of the slope current $I_{SLP}$. In detail, a reversed clock signal CLKB is set to a low level during the active period of the clock signal CLK, an NMOS transistor N31 continues to be turned off. Thus, the slope voltage $V_{SLP}$ is raised by a current entering from a current source CS3. The slope voltage $V_{SLP}$ is converted into a slope compensation current $I_{SLP}$ by a voltage-current converter 2120. In contrast, the reversed clock signal CLKB is set to a high level, and thus the NMOS transistor N31 is turned on. Thus, a short occurs across the capacitor C3, and thus the slope current $I_{SLP}$ is not generated. In this manner, the slope current generating unit 210 generates the slope current $I_{SLP}$ during the active period of the clock signal CLK to reduce unnecessary current consumption.

Figure 20:
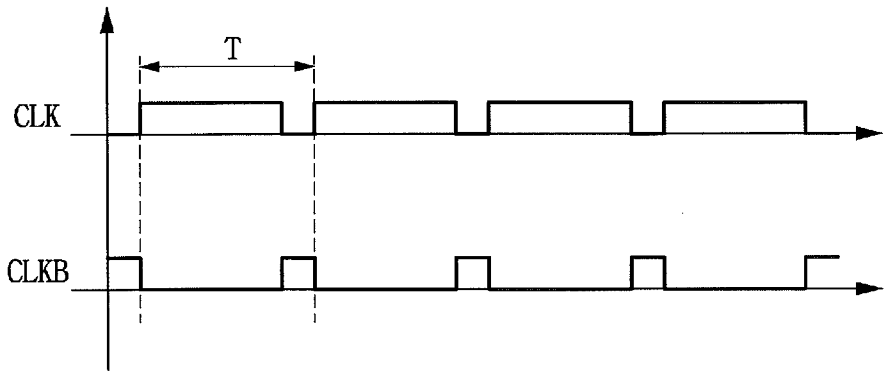
FIG. 20 is a waveform diagram illustrating the clock signals of FIG. 19.

FIG. 20 is a waveform diagram illustrating the clock signals of FIG. 19 according to some embodiments.

Referring to FIG. 20, the clock signal CLK, which is generated by the clock generating unit 5 and then is input into the slope current generating unit 210, has the reverse phase of the reversed clock signal CLKB, which turns on or off the NMOS transistor N31 of the slope current generating unit 210.

Figure 21:
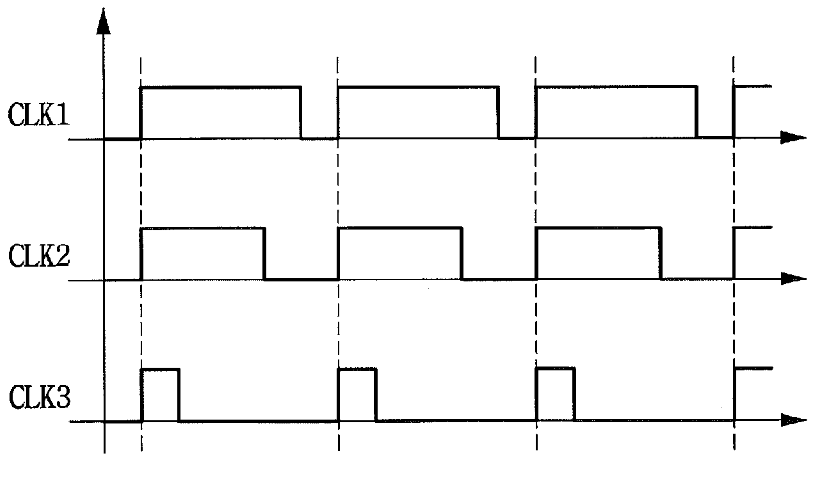
FIG. 21 is a waveform diagram illustrating clock signals of the clock generating unit of FIG. 17.

FIG. 21 is a waveform diagram illustrating clock signals of the clock generating unit of FIG. 17 according to some embodiments.

Referring to FIG. 21, the clock generating unit 5 may generate clock signals CLK1, CLK2 and CLK3 having different pulse widths depending on an change in the maximum value of the active period of the switching signal SW or other factors, rather than the clock signal having the fixed pulse width.

As described above, the display apparatus according to the third embodiment of the inventive concept receives the first detection voltage VDET1 varying based on the coil current $I_L$ and the second detection voltage VDET2 varying based on the LED supply voltage VLED, and converts the detection current $I_{DET}$ and the reference current $I_{REF}$ respectively. The display apparatus adjusts the active period of the switching signal SW according to the result of comparing the detection current $I_{DET}$ with the reference current $I_{REF}$, and controls the LED supply voltage VLED to be maintained constant. Particularly, the clock generating unit 5 generates the clock signal CLK having an active period longer than the active period of the switching signal SW, and the slope current generating unit 210 generates the slope current $I_{SLP}$ in response to the clock signal CLK only during the period in which the compensation of the detection current $I_{DET}$ is required. Thus, the display apparatus prevents or reduces the likelihood of the duty ratio of the switching signal SW being distorted by the tailing component of the slope current $I_{SLP}$, and prevents or reduces malfunction. Further, the slope current $I_{SLP}$ is restrictively generated only during the active period of the clock signal CLK, so that the display apparatus can reduce power consumption.

Figure 22:
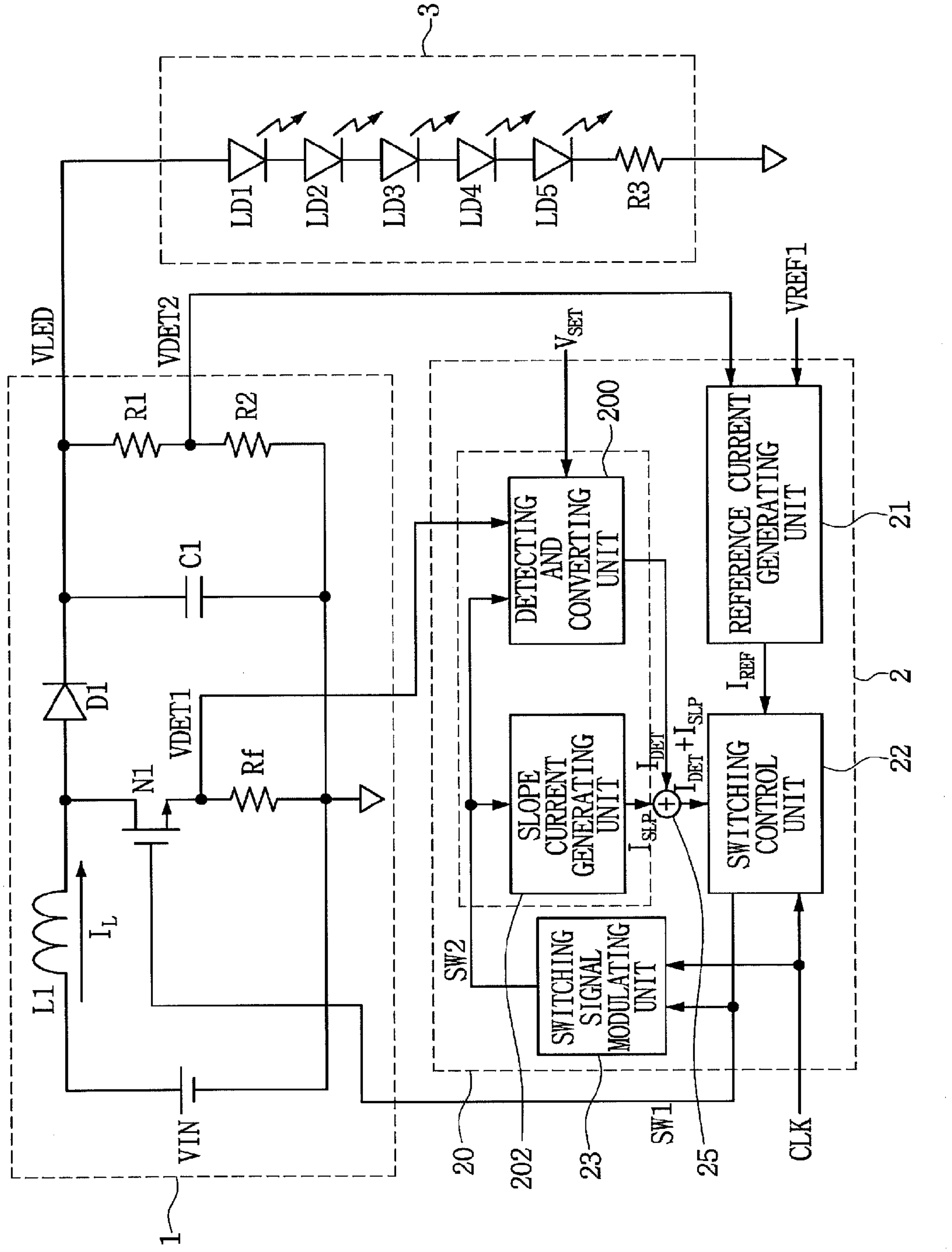
FIG. 22 illustrates a display apparatus according to a fourth embodiment of the inventive concept.

FIG. 22 illustrates a display apparatus according to a fourth embodiment of the inventive concept.

As illustrated in FIG. 22, the display apparatus according to a second embodiment of the inventive concept includes an LED supply voltage generating unit 1, a control unit 2, and a lighting unit 3. Here, the control unit 2 includes a voltage detecting and current generating unit 20, a reference current generating unit 21, a switching control unit 22, and a switching signal modulating unit 23. The voltage detecting and current generating unit 20 includes a detecting and converting unit 200 and a slope current generating unit 210.

In the control unit 2, exemplary operations of each block will be described below.

Parts overlapping with the control unit of FIG. 9 and FIG. 17 will be omitted or described in brief.

First, the detecting and converting unit 200 of the voltage detecting and current generating unit 20 detects first detection voltage VDET1 varying based on coil current $I_L$, converts the first detection voltage VDET1 into detection current $I_{DET}$, and outputs the detection current $I_{DET}$. Thus, the detection current $I_{DET}$ also varies depending on the coil current $I_L$. The slope current generating unit 210 generates slope compensation current $I_{SLP}$ during the active period of a second switching signal SW2 to compensate for a distortion of the detection current $I_{DET}$. The slope compensation current $I_{SLP}$ is added to the detection current $I_{DET}$, and the compensated detection current $I_{DET}+I_{SLP}$ is input to the switching control unit 22. Because this compensated detection current $I_{DET}+I_{SLP}$ varies based on the coil current $I_L$, it is possible to detect a change in electromotive force of a coil L1 through the compensated detection current $I_{DET}+I_{SLP}$. In detail, an increase in the compensated detection current $I_{DET}+I_{SLP}$ means that the electromotive force of the coil L1 increases. Likewise, a decrease in the compensated detection current $I_{DET}+I_{SLP}$ means that the electromotive force of the coil L1 decreases.

Meanwhile, the detecting and converting unit 200 and the slope current generating unit 210, both of which constitute the voltage detecting and current generating unit 20, control voltage and current in response to the second switching signal SW2. In detail, the detecting and converting unit 200 and the slope current generating unit 210 are operated by the voltage and current received during the active period of the second switching signal SW2, and interrupt the voltage and current when the second switching signal SW2 is inactivated, thereby reducing power consumption.

Next, the reference current generating unit 21 compares LED supply voltage VLED with target voltage using second detection voltage VDET2 and first reference voltage VREF1, and generates reference current $I_{REF}$ for adjusting a duty ratio of the first switching signal SW1 output from the switching control unit 22. More specifically, the reference current generating unit 21 increases the reference current $I_{REF}$ as a voltage difference between the first reference voltage VREF1 and the second detection voltage VDET2 increases, and decreases the reference current $I_{REF}$ as the voltage difference decreases. Meanwhile, when the second detection voltage VDET2 reaches the first reference voltage VREF1, the reference current generating unit 21 maintains the reference current $I_{REF}$ constant. Here, the reference current generating unit 21 may be implemented as an OTA, which converts a difference between two voltages into a current.

Next, the switching control unit 22 compares the compensated detection current $I_{DET}+I_{SLP}$ with the reference current $I_{REF}$, and generates the switch signal SW, whose period is identical to that of a clock signal CLK, and whose duty ratio is adjusted. More specifically, the switching control unit 22 activates the first switching signal SW1 in response to the clock signal CLK. Further, when the compensated detection current $I_{DET}+I_{SLP}$ is less than the reference current $I_{REF}$, the switching control unit 22 determines that the electromotive force of the coil L1 is still insufficient to raise the LED supply voltage VLED to the target voltage, and thus continues to maintain the active period of the first switching signal SW1. In contrast, when the compensated detection current $I_{DET}+I_{SLP}$ becomes equal to the reference current $I_{REF}$, the switching control unit 22 determines that the electromotive force of the coil L1 is sufficient to raise the LED supply voltage VLED to the target voltage, and thus inactivates the first switching signal SW1.

Next, the switching signal modulating unit 23 receives the first switching signal SW1 and the clock signal CLK, modulates a pulse width of the first switching signal SW1 to generate the second switching signal SW2 having another pulse width.

Figure 23:
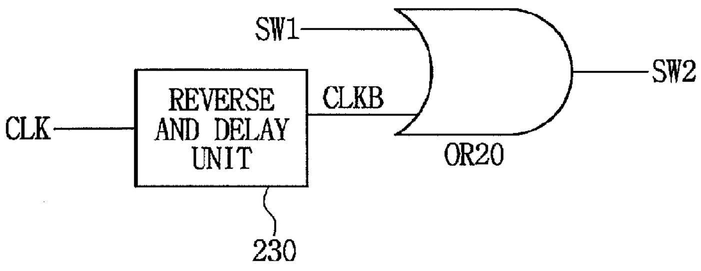
FIG. 23 is a circuit diagram illustrating the switching signal modulating unit of FIG. 21

FIG. 23 is a circuit diagram illustrating the switching signal modulating unit of FIG. 22 according to some embodiments.

As illustrated in FIG. 23, the switching signal modulating unit 23 includes a reverse and delay unit 230, and OR gate OR20. The reverse and delay unit 230 reverses and delays the clock signal CLK, and outputs a reversed clock signal CLKB. The OR gate OR20 performs an OR logic operation with the reversed clock signal CLKB and the first switching signal SW1. Thus, the switching signal modulating unit 23 generates the second switching signal SW2 activated when the first switching signal SW1 is activated to a high level or when the reversed clock signal CLKB is activated to a high level. As a result, a active period of the second switching signal SW2 is longer than that of the first switching signal SW1 by a active period of the reversed clock signal CLKB.

Figure 24:
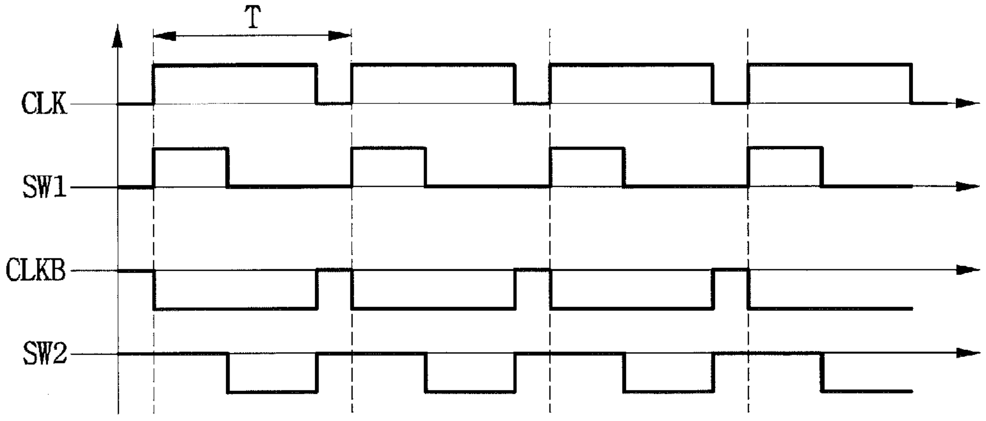
FIG. 24 is a waveform diagram for explaining an operation of the switching signal modulating unit of FIG. 22.

FIG. 24 is a waveform diagram for explaining exemplary operations of the switching signal modulating unit of FIG. 22.

Referring to FIG. 24, the reverse and delay unit 230 reverses and delays the clock signal CLK, and outputs a reversed clock signal CLKB. The OR gate OR20 generates the second switching signal SW2 activated when the reversed clock signal CLKB is activated to a high level, and inactivated when the first switching signal SW1 is inactivated to a low level. As a result, the second switching signal SW2 is activated earlier than the first switching signal SW1 by the active period of the reversed clock signal CLKB.

The detecting and converting unit 200 and the slope current generating unit 210 can not perform a stable operation immediately as soon as the power is supplied to the detecting and converting unit 200 and the slope current generating unit 210. It takes a certain period for levels of inner nodes of the detecting and converting unit 200 and the slope current generating unit 210 to be stabilized. Thus, the switching signal modulating unit 23 guarantees a setup time for a stable operation of the detecting and converting unit 200 and the slope current generating unit 210. Thus, the activation time of the second switching signal SW2 is advanced the active period of the reversed clock signal CLKB from that of the first switching signal SW1.

Figure 25:
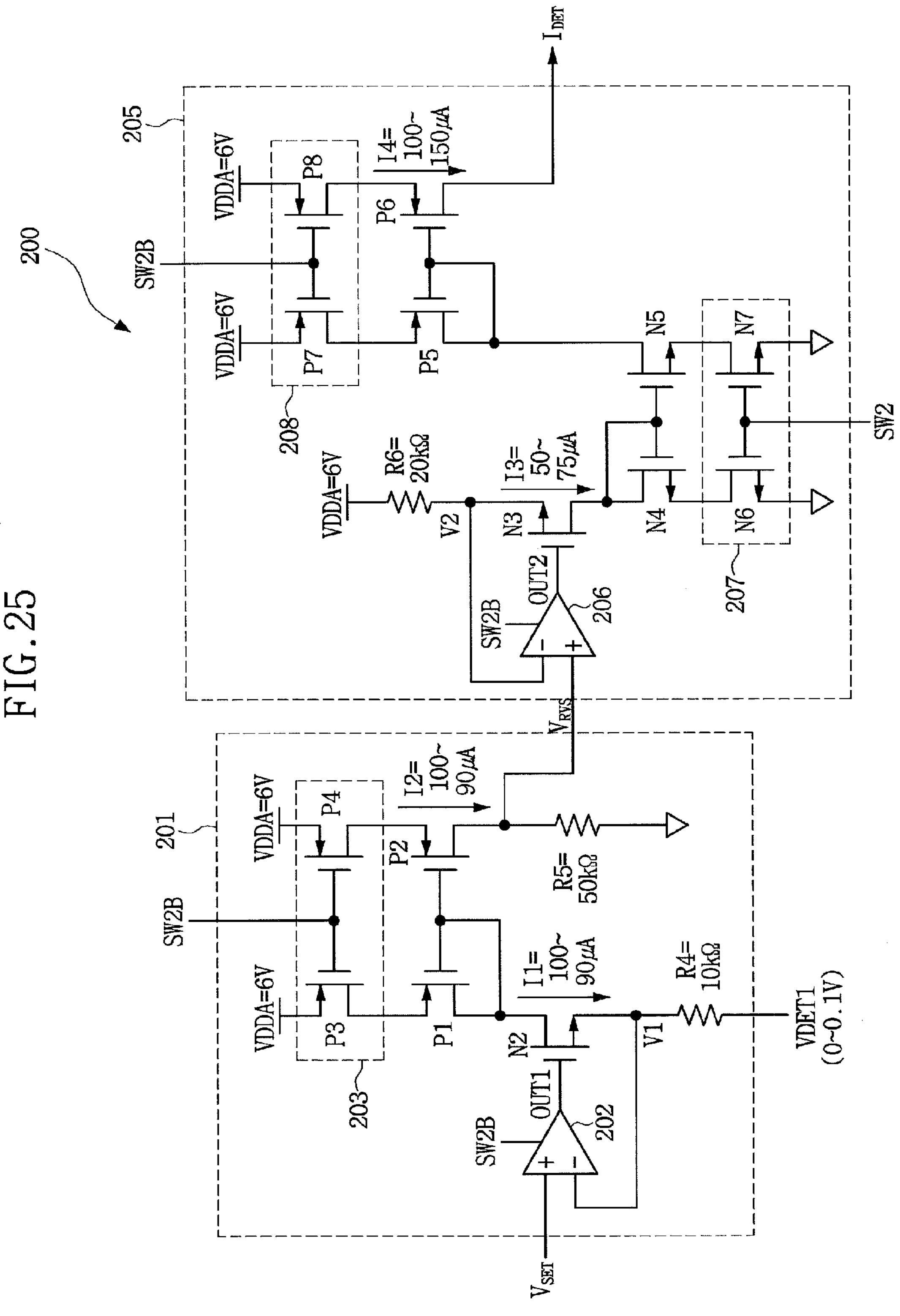
FIG. 25 is a circuit diagram illustrating the detecting and converting unit of FIG, 22.

FIG. 25 is a circuit diagram illustrating the detecting and converting unit of FIG. 22.

The detecting and converting unit 200 of FIG. 25 is fundamentally similar to that of the second embodiment shown in FIG. 11, and so only configuration differences will be described.

A first voltage control unit 203 of the voltage control unit 201 controls supply of supply voltage VDDA, which is applied to the voltage control unit 201, in response to the second switching reverse signal SW2B. Here, the second switching reverse signal SW2B is a signal that reverses the second switching signal SW2.

Next, a second voltage control unit 207 of the voltage-current converting unit 205 controls supply of the supply voltage VDDA in response to the second switching signal SW2, and a third voltage control unit 208 controls supply of the supply voltage VDDA in response to the second switching reverse signal SW2B.

In this manner, the detecting and converting unit 200 receives the supply voltage VDDA only during the active period of the second switching signal SW2 through the first, second and third voltage control units 203, 207 and 208, and stops the supply of the supply voltage NDDA when the second switching signal SW2 is inactivated so as to prevent unnecessary power consumption. Also, detecting and converting unit 200 guarantee the set-up time for the stable operation in response to the second switching signal SW2 and the second switching reverse signal SW2B.

Figure 26:
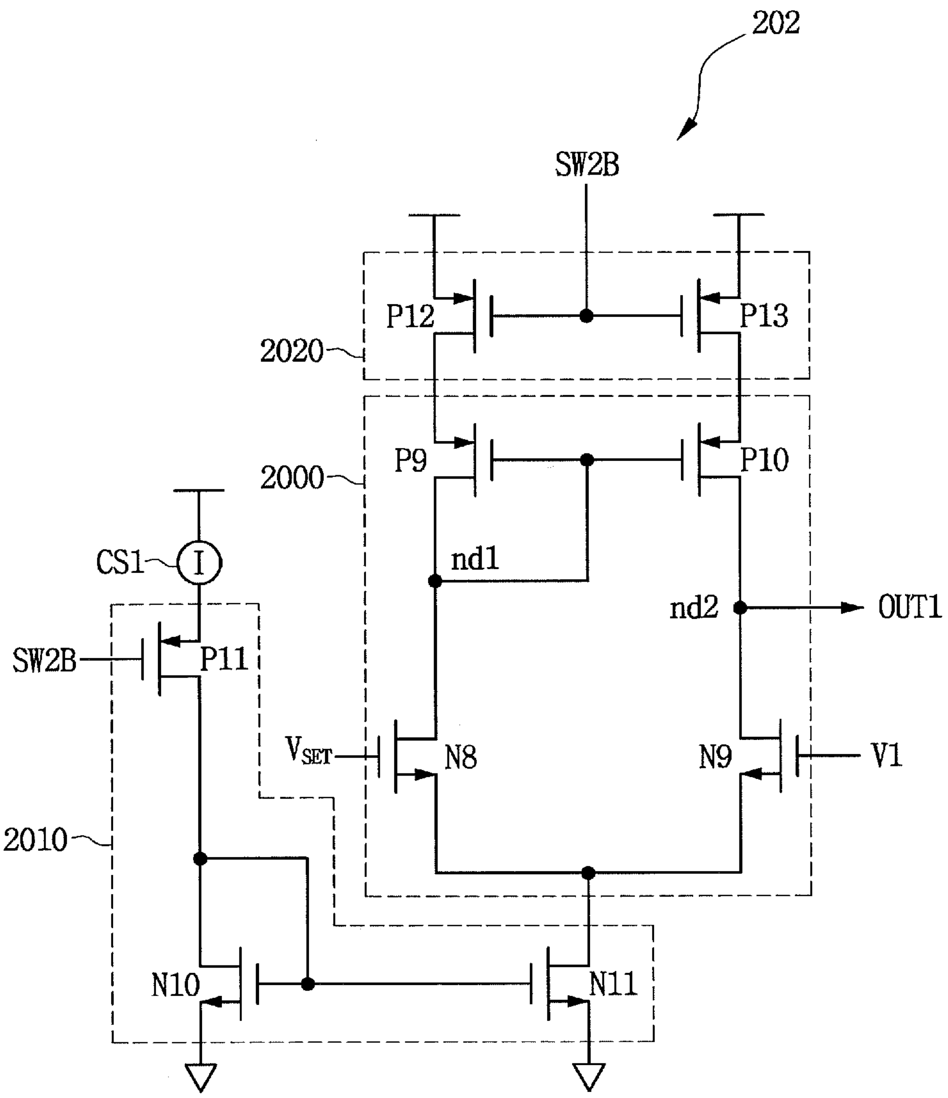
FIG. 26 is a circuit diagram illustrating the first amplifier of FIG. 25.

FIG. 26 is a circuit diagram illustrating the first amplifier of FIG. 25 according to some embodiments.

As illustrated in FIG. 26, the first amplifier 202 includes an amplifying unit 2000, a current control unit 2010, and a fourth voltage control unit 2020.

The amplifying unit 2000 receives both a set voltage $V_{SET}$ higher than threshold voltage of an NMOS transistor N8 and first voltage V1, and differentially amplifies a voltage difference between the set voltage $V_{SET}$ and the first voltage V1. The current control unit 2010 applies or interrupts a current to or from the amplifying unit 2000 in response to the second switching reverse signal SW2B. In detail, when the second switching signal SW2 is activated to a high level, the second switching reverse signal SW2B is activated to a low level, and thus the current of a current source CS1 flows to an NMOS transistor N10 through a PMOS transistor P11. Further, the current flows to an NMOS transistor N11 by a current mirror. As a result, the current flows to the amplifying unit 2000 through the NMOS transistor N11. Meanwhile, the fourth voltage control unit 2020 applies a voltage to the amplifying unit 2000 in response to the second switching reverse signal SW2B. In detail, when the second switching signal SW2 is activated to a high level, the second switching reverse signal SW2B is activated to a low level, PMOS transistors P12 and P13 are turned on, and thus the voltage is applied to the amplifying unit 2000.

In this manner, the first amplifier 202 applies the current to the amplifying unit 2000 through the current control unit 2010 during the active period of the second switching signal SW2, and applies the voltage to the amplifying unit 2000 through the fourth voltage control unit 2020. Thus, the first amplifier 202 performs the differential amplification. In contrast, when the second switching signal SW2 is inactivated, both the current and the voltage are interrupted by the current control unit 2010 and the fourth voltage control unit 2020, so that the first amplifier 202 can avoid unnecessary power consumption. In other words, the first amplifier 202 is powered during the active period of the second switching signal SW2, and thus performs normal differential amplification.

In the embodiment of FIG. 26, the first amplifier 202 is illustrated to have both the current control unit 2010 and the fourth voltage control unit 2020. Alternatively, the first amplifier 202 may include selectively only one of the current control unit 2010 and the fourth voltage control unit 2020.

Meanwhile, in the detecting and converting unit 200, the first amplifier 202 has the same configuration as the second amplifier 206. As such, the second amplifier 206 also receives supply voltage and current only during the active period of the second switching signal SW2, and thus performs normal differential amplification during the active period of the second switching signal SW2.

As described above, the display apparatus according to the fourth embodiment of the inventive concept supplies the voltage and current to the voltage detecting and current generating unit 20 only during the active period of the second switching signal SW2 in which the effective operation is substantially performed, and interrupts the voltage and current during the inactive period of the second switching signal SW2, thereby reducing unnecessary power consumption. Further, the display apparatus according to the fourth embodiment guarantees a setup time for stable operation of the voltage detecting and current generating unit 20 by modulating the active period of the second switching signal SW2.

Meanwhile, the lighting unit 3 including a plurality of LEDs is suggested as one example to explain operational characteristics of the control unit 2. Thus, the control unit 2 can not be only applied to a LED display, but also applied to various displays or other system apparatus to maintain supply voltage constant.

Figure 27:
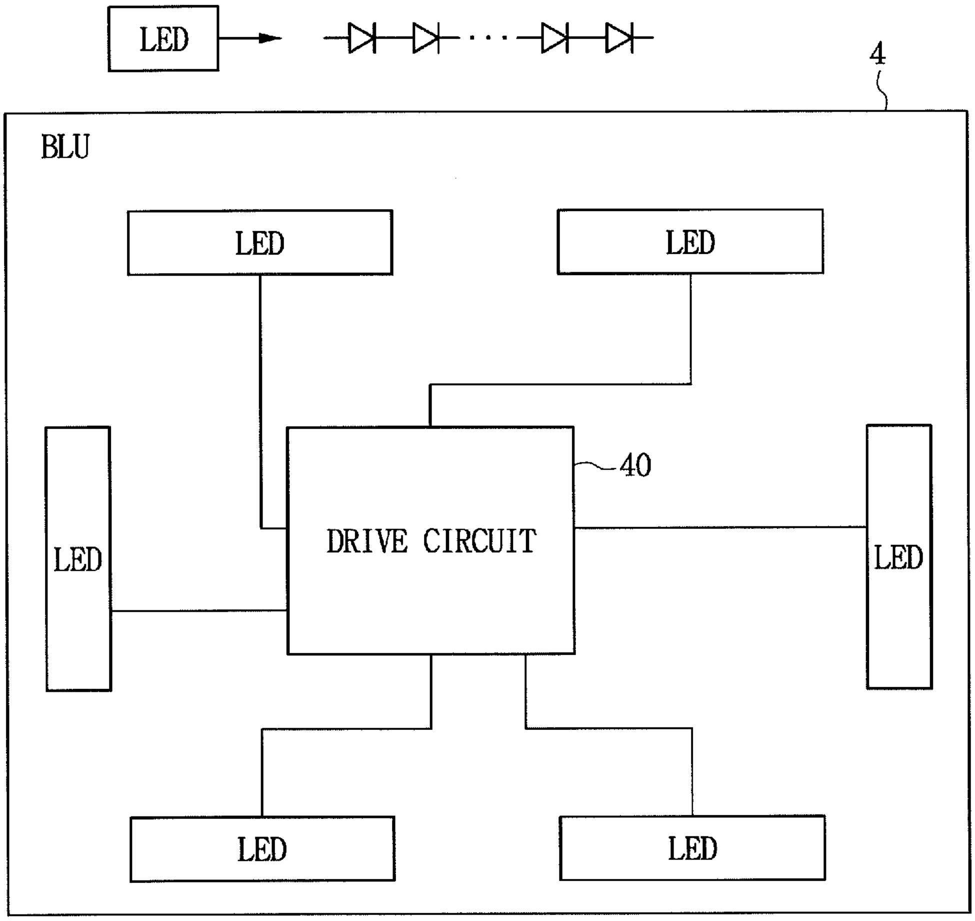
FIG. 27 illustrates an LED display to which a back light unit having LEDs is applied in accordance with an example embodiment of the inventive concept.

FIG. 27 illustrates an LED display to which a back light unit having LEDs is applied in accordance with an example embodiment of the inventive concept.

LEDs are self-emission elements. When LEDs emitting light of various colors are combined, it is possible to realize an image using the LEDs alone. Further, the LED may be applied to a back light unit (BLU) 4 for projecting light toward a display panel such as a liquid crystal display (LCD) panel, which does not emit the light by itself. Because liquid crystals are not substances that emit the light by itself, the LCD panel realizes an image by transmitting light of the LED which is projected toward the side or front thereof.

The BLU 4 illustrated in FIG. 27 is an edge type BLU for projecting light toward the side of the display panel. A plurality of LEDs are disposed on each side of the BLU 4. This edge type BLU 4 may be applied to displays having a large display panel such as LED TVs. The BLU 4 includes a drive circuit 40 having a plurality of LED supply voltage generating units 1 and a plurality of control units 2, both of which are illustrated in FIG. 1.

Figure 28:
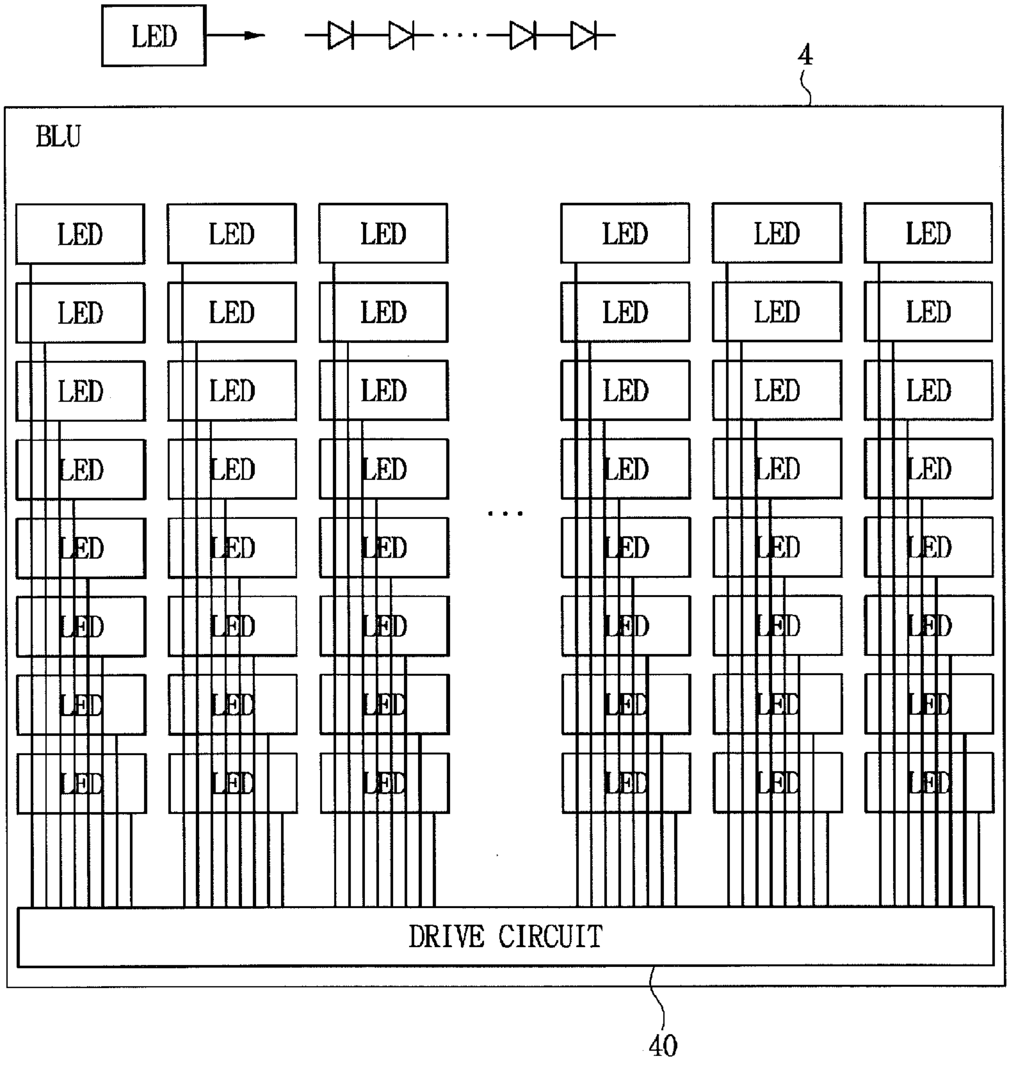
FIG. 28 illustrates an LED display to which a back light unit having LEDs is applied in accordance with another example embodiment of the inventive concept.

FIG. 28 illustrates an LED display to which a back light unit having LEDs is applied in accordance with another example embodiment of the inventive concept.

The BLU 4 illustrated in FIG. 28 is a direct type BLU for directly projecting light toward the entire surface of the display panel. A plurality of LEDs are disposed on the entire surface of the BLU 4 to correspond to the entire surface of the display panel. This direct type BLU 4 may be applied to displays such as LED TVs. The BLU 4 includes a drive circuit 40 having a plurality of LED supply voltage generating units 1 and a plurality of control units 2, both of which are illustrated in FIG. 1.

Figure 29:
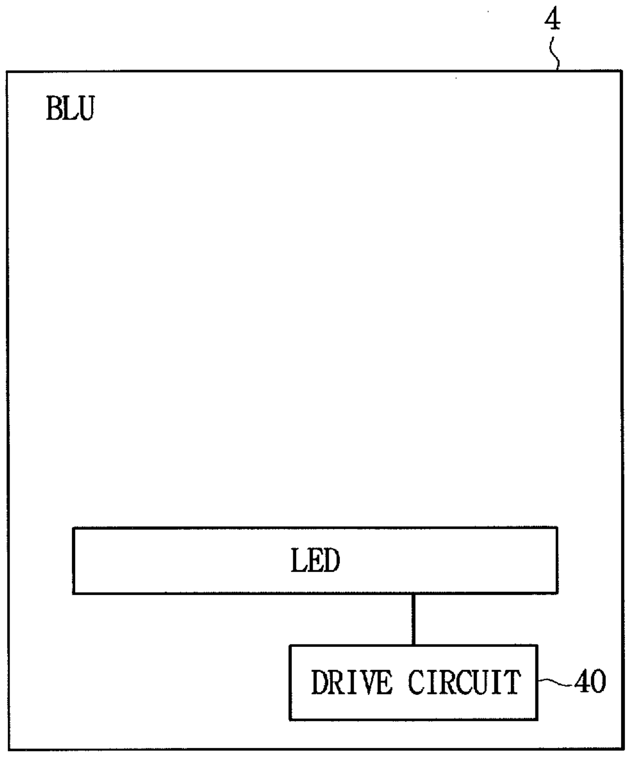
FIG. 29 illustrates an LED display to which a back light unit having LEDs is applied in accordance with still another example embodiment of the inventive concept.

FIG. 29 illustrates an LED display to which a back light unit having LEDs is applied in accordance with still another example embodiment of the inventive concept.

The BLU 4 illustrated in FIG. 29 is an edge type BLU. Unlike the BLU of FIG. 27, LEDs are disposed only on one side of the BLU 4. This edge type BLU 4 may be applied to displays having a small display panel for portable video appliances such as mobile phones, personal digital assistants (PDAs), and portable multimedia player (PMP). The BLU 4 also includes a drive circuit 40 having a plurality of LED supply voltage generating units 1 and a plurality of control units 2, both of which are illustrated in FIG. 1.

The foregoing is illustrative of example embodiments and is not to be construed as limiting thereof. Although a few example embodiments have been described, those skilled in the art will readily appreciate that many modifications are possible in example embodiments without materially departing from the novel teachings and advantages. Accordingly, all such modifications are intended to be included within the scope of this invention as defined in the claims. In the claims, means-plus-function clauses are intended to cover the structures described herein as performing the recited function, and not only structural equivalents but also equivalent structures. Therefore, it is to be understood that the foregoing is illustrative of various example embodiments and is not to be construed as limited to the specific embodiments disclosed, and that modifications to the disclosed embodiments, as well as other embodiments, are intended to be included within the scope of the appended claims.

The invention claimed is:

1. A power supply system, comprising:

a control unit, comprising:

a detecting and converting unit that is configured to generate a detected current based on a difference between a set voltage and a voltage representative of a current flow through an energy storage member;

wherein the detecting and converting unit comprises:

a voltage control unit that is configured to generate a reverse voltage responsive to the set voltage and the voltage representative of the current flow through the energy storage member, a magnitude of the reverse voltage being inversely correlated with a magnitude of the voltage representative of the current flow through the energy storage member; and a voltage-current converting unit that is configured to generate the detected current responsive to the reverse voltage, a magnitude of the detected current being inversely correlated with a magnitude of the reverse voltage.

2. The power supply system of claim 1, further comprising:

a supply voltage generating unit that is configured to generate an output voltage in response to an input voltage, wherein the supply voltage generating unit comprises the energy storage member coupled between the input voltage and a switch such that the energy storage member stores energy when the switch is in a first state and releases energy in a second state to generate the output voltage.

3. The power supply system of claim 2, wherein the control unit further comprises:

a reference current generating unit that is configured to generate a reference current based on a difference between the output voltage and a reference voltage;

wherein the control unit is configured to control the duty cycle of the switch between the first and second states based on the detected current and the reference current.

4. The power supply system of claim 3, wherein the control unit further comprises:

a slope current generating unit that is configured to generate a compensation current;

an adder that is configured to combine the compensation current and the detected current;

wherein the control unit is configured to control the duty cycle of the switch between the first and second states based on the combination of the compensation current and the detected current and the reference current.

5. The power supply system of claim 1, further comprising:

a voltage generating unit that is configured to generate the set voltage responsive to a power supply voltage.

6. The power supply system of claim 1, wherein the set voltage is set to be greater than the voltage representative of the current flow through the energy storage member.

7. The power supply system of claim 1, wherein the set voltage has a predetermined voltage level.

* * * * *